United States Patent
Volz et al.

(10) Patent No.: US 7,533,164 B2
(45) Date of Patent: May 12, 2009

(54) METHOD AND SYSTEM FOR ENABLING CONNECTIONS INTO NETWORKS WITH LOCAL ADDRESS REALMS

(75) Inventors: Bernie Volz, Center Harbor, NH (US); George Chambert, Uppsala (SE); Martin Korling, Sollentuna (SE); Bjorn Landfeldt, Menai (AU); Yuri Ismailov, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 29 days.

(21) Appl. No.: 10/510,546

(22) PCT Filed: Mar. 28, 2003

(86) PCT No.: PCT/US03/09834

§ 371 (c)(1),
(2), (4) Date: Apr. 25, 2005

(87) PCT Pub. No.: WO03/088625

PCT Pub. Date: Oct. 23, 2003

(65) Prior Publication Data

US 2005/0223095 A1 Oct. 6, 2005

Related U.S. Application Data

(60) Provisional application No. 60/370,812, filed on Apr. 8, 2002.

(51) Int. Cl.
*G06F 15/16* (2006.01)
*G06F 15/173* (2006.01)
(52) U.S. Cl. .......................... 709/223; 709/245
(58) Field of Classification Search ................. 709/223, 709/220, 226, 227, 238, 230, 244, 245, 250
See application file for complete search history.

(56) References Cited

U.S. PATENT DOCUMENTS 6,886,103 B1 * 4/2005 Brustoloni et al. ............ 726/15

(Continued)

FOREIGN PATENT DOCUMENTS

EP 0817444 A 1/1998

(Continued)

OTHER PUBLICATIONS

Srisuresh P et al., "RFC 2694; DNS Extensions to Network Address Translators (DNS_ALG)", Sep. 1999, Internet Engineering Task Force XP002247781.

(Continued)

*Primary Examiner*—Jeffrey Pwu
*Assistant Examiner*—Benjamin R Bruckart
(74) *Attorney, Agent, or Firm*—Nixon & Vanderhye P.C.

(57) ABSTRACT

The invention generally concerns the issue of providing connectivity between two different address realms, generally referred to as an inside realm and an outside realm, by establishing connections through an intermediate gateway. The gateway normally has a number of outside-realm gateway addresses for enabling representation of inside-realm nodes in the outside realm. In a first aspect, support for flexible outside-realm initiated connections is enabled by dynamically establishing new gateway connection states triggered, for each new connection, by a respective user-resource identifier query initiated from a corresponding outside node. In a second aspect of the invention, intelligent use of predetermined connection information in the process of setting up new gateway connection states makes it possible to significantly increase the number of connections that can be simultaneously supported by the gateway using a limited number of outside-realm addresses.

60 Claims, 15 Drawing Sheets

U.S. PATENT DOCUMENTS 6,892,245 B1 * 5/2005 Crump et al. ............... 709/245

FOREIGN PATENT DOCUMENTS

WO         WO 9930467 A     6/1999

OTHER PUBLICATIONS

Srisuresh P et al., "Middlebox communication architecture and framwork", Internet Engineering Task Force, XX.XX, Feb. 28, 2002.
C Huitema, "Midcom Scenarios; draft-ietf-midcom-scenarios-02.txt>", May 17, 2001, Internet Engineering Task Force, Internet XP002247782.
Dias D M et al., "A scalable and highly available web server" Digest of Papers of Compcon (Computer Society Conference) 1996 Technologies for the Information Superhighway. Santa Clara, Feb. 25-28, 1996, Digest of Papers of the Computer Society Computer Conference Compcon, Los Alamitos, IEEE Comp. Soc. Press, vol. Conf. 41, Feb. 25, 1996, pp. 85-92, XP010160879, ISBN: 0-8186-7414-8, the whole document.
European Patent Office, International Search Report for PCT/US03/09834, dated Jul. 21, 2003.
P. Srisuresh et al., IP Network Address Translator (NAT) Terminology and Considerations, Network Working Group, Request for Comments: 2663, Aug. 1999, pp. 1-27.
M. Borella et al., Realm Specific IP: Framework, Network Working Group, Request for Comments: 3102, Oct. 2001, pp. 1-27.
M. Borella et al., Real Specific IP: Protocol Specification, Network Working Group, Request for Comments: 3103, Oct. 2001, pp. 1-.
Y. Rekhter et al., Address Allocation for Private Internets, Network Working Group, Request for comments: 1918, Feb. 1996, pp. 1-9.
M. Handley, SIP: Session Initiation Protocol, Network Working Group, Request for Comments: 2543, Mar. 1999, pp. 1-135.
e-Boarder Solution Series 1: Solving NAT and Private IP Problems, Permeo Technologies, Inc., Jul. 2001, pp. 1-8.

* cited by examiner

METHOD AND SYSTEM FOR ENABLING CONNECTIONS INTO NETWORKS WITH LOCAL ADDRESS REALMS

This application claims the benefit of U.S. provisional patent application Ser. No. 60/370,812, filed Apr. 8, 2002.

TECHNICAL FIELD OF THE INVENTION

The present invention generally relates to network communication and more particularly to the issue of providing connectivity between networks of different address realms.

BACKGROUND OF THE INVENTION

In network communication, there is a general demand for providing connectivity between different networks, especially when the networks have different address realms. For example, this would normally be the case when a node in a private network wants to connect to a host in a public network. The private network usually have internal addresses that cannot be used outside the network, for privacy reasons or simply because the internal addresses are invalid for use outside the network. Other examples include connectivity between networks of different public domains, as well as between different private networks.

With the explosive growth of Internet Protocol (IP) networks such as the Internet, intranets and other networks, the limited IP address space offered by the current version of the IP protocol, IPv4, becomes a real challenge. With a 32-bit address field, it is possible to assign $2^{32}$ different addresses, which are about 4 billion globally unique addresses. The next version of the IP protocol, IPv6, will have a 128-bit address field, thus providing a virtually unlimited number of globally unique IP addresses. The challenge is that there is a limited number of IPv4 addresses available to the operators for their new networks, and IPv6 is not yet supported by more than a very limited set of nodes within the Internet. Also, a large number of legacy networks including Internet subnets will likely be using the IPv4 or older versions of the IP protocol for many years to come.

For mobile or cellular networks, telecom vendors and operators are facing a great challenge deploying support for an expected vast number of IP-enabled mobile terminals in 2.5 and 3G networks. The IPv4 address space is apparently not large enough to cover the needs when a massive deployment of 2.5 and 3G networks takes place within the near future. Today, network operators that apply for address ranges for their new cellular networks receive address spaces far below the expected number of users. The ratio can be as low as a few thousand addresses for an expected customer base of millions of subscribers.

To meet the demand for addresses, telecom vendors are pushing the introduction of IPv6 into terminals as the standard protocol to use within next generation cellular networks. IPv6, fully deployed would naturally solve the address space problem, but unfortunately, IPv6 is not widely deployed in the Internet yet, and it is expected that this deployment will be quite slow, at least in the near future. Since IPv6 is not deployed in the Internet, vendors will have to use migration schemes for providing connectivity between different networks.

There are a number of existing schemes for both extending an address realm and for translating between different address realms. These schemes will be briefly outlined below, mainly with respect to the issue of providing connectivity between private and public networks operating under the IP protocol.

With reference to FIG. 1, a private realm is a domain where hosts are assigned addresses that are not unique within the Internet, or they are unique but for some reason they are hidden from the public realm. A common example is to assign hosts in a private network 10 with private addresses [a.a.a.a] to [a.d.d.d], for example as specified in RFC1918, to enable multiple hosts to share a single or some public IP addresses when the number of private realm hosts exceeds the number of public addresses assigned for the private network 10. Since there is no assigned body coordinating the use of private addresses, these addresses occur at multiple locations around the world and therefore they are generally not unique and can thus not be used within the public realm. In order for private hosts to be able to access the public realm network 20, a gateway 30 can be used for enabling multiple private hosts to share a single or some public IP addresses [x.x.x.x] to [x.x.x.z] for the purpose of public realm access. The gateway 30 thus provides the necessary means for connecting hosts within the private realm to the public realm, especially when the number of private hosts is larger than the number of available public IP addresses.

Network Address Translator (NAT)

Existing schemes for extending address realms such as the IPv4 address space are often based on so-called Network Address Translator (NAT) gateways, which translate private addresses into public addresses and vice versa [1]. The different flavors of NAT have in common that they all hide private addresses and reuse public addresses to enable communication between hosts in a private realm and hosts in the public realm.

Traditional NAT

A traditional NAT gateway typically uses a set of public IP addresses to assign to individual private nodes on a per-session basis. When a host within the private realm wants to contact a host within a public network such as the Internet, the NAT assigns one of its public addresses [x.x.x.x] to [x.x.x.z] to the private host. The NAT then rewrites the sender address in the IP header of the outgoing packet with the public address so the corresponding host in the public Internet gets the impression that the packet came from the publicly assigned IP address. When the public host sends a packet back to the publicly assigned address, the NAT rewrites the destination address in the IP header with the private address so the packet is correctly routed in the private realm.

This method of translating between the two realms is simple but suffers from two drawbacks other methods have tried to solve. Firstly, it does not allow a host in the public Internet to connect to a host within the private realm and secondly, it does not scale very well since every time a private host wants to connect to a public realm host, an entire public IP address is reserved for the host.

Network Address Port Translation (NAPT)

NAPT alleviates the scalability problem by enabling multiple private realm hosts to share a single IP address. This is accomplished by including transport protocol port information into the translation procedure. When a host in the private realm wants to connect to a host in the public realm, the gateway assigns a free port on the public realm interface to the connection and uses the original and assigned ports together with the IP addresses for the translation. This way the NAPT gateway can share a single IP address among several private hosts.

For example, consider a host [a.a.a.a] that wants to connect to host [d.d.d.d] on the public Internet. When the first packet to host [d.d.d.d] reaches the NAT it assigns a free port on an interface, say public IP address [x.x.x.x], to the connection and rewrites the sender address from [a.a.a.a] into [x.x.x.x] and the sender port number to the assigned port number. When the receiver replies the destination address is [x.x.x.x] and the port is the assigned port number. When this packet reaches the NAPT gateway, it rewrites the destination address with [a.a.a.a] and the destination port number with the original port number.

Thus, NAPT scales better than traditional NAT, but it is still impossible for hosts within the public realm to initiate sessions to hosts within the private realm.

Bi-directional NAT

Bi-directional NAT enables hosts on the public Internet to reach hosts within a private realm. This is accomplished through the introduction of a special Application Layer Gateway (ALG), to a Domain Name Server (DNS) in conjunction with the bi-directional NAT. The ALG is capable of resolving Fully Qualified Domain Names (FQDN) of private realm hosts to assigned public realm addresses. The ALG is capable of translating the private realm address corresponding to a FQDN into a public realm address and vice versa. The bi-directional NAT allows hosts within the public Internet to communicate with hosts within a private realm, but there is a one-to-one mapping between hosts and public IP addresses which scales poorly when public IP addresses are scarce.

Realm Specific IP (RSIP)

RSIP takes a different approach than NAT to provide connectivity between different realms [2, 3]. RSIP uses a special node that is aware of the different realms and can distinguish between the two.

In general terms, RSIP uses two entities, a RSIP server and a RSIP client. The RSIP server is present in both realms and can provide router functionality between the realms. It can also be the node assigning public addresses to private hosts. The RSIP client is a node within the private realm that can temporarily use a public address when communicating with public hosts. Hence, RSIP makes use of public addresses for both parties when communicating between the private and public realms, and does not perform any address translation.

An advantage of this scheme is that there is no need to deploy ALGs for applications since public realm addresses are used even for private clients. However, plain RSIP does not allow public realm initiated connections.

There are two flavors of RSIP, namely Realm Specific Address IP (RSA-IP) and Realm Specific Address and Port IP (RSAP-IP).

Realm Specific Address IP (RSA-IP)

An RSA-IP client is assigned a public IP address when communicating with the public realm. This procedure is a one-to-one mapping and hence, no other host can use the address until it is released by the client (so-called address granularity). The packets are typically tunneled through the private realm to the RSA-IP server or they can be tunneled end-to-end.

Realm Specific Address and Port IP (RSAP-IP)

RSAP-IP operates similar to RSA-IP with the difference that RSAP-IP clients are assigned public IP addresses as well as associated ports (so-called port granularity). This way, several RSAP-IP clients can share public IP addresses. The multiplexing is performed through adding both an IP tunnel and an additional transport header with the assigned port as identifier if the public host terminates the tunnel. If the RSAP-IP server terminates the tunnel, the multiplexing is based on both destination address and port.

NAT-PT

Another flavor of NAT, called NAT-PT, adds specific protocol translation between IPv4 and IPv6. NAT-PT comes in three flavors corresponding to standard NAT, NAPT and bi-directional NAT. Bi-directional NAT-PT has support for public realm initiated communication, but with a one-to-one mapping of public IP address to private realm host. However, this scheme also does not scale very well due to the limited number of available public IPv4 addresses.

In general, public-realm initiated communication is enabled by manually and statically configuring the gateway such that an inside-bound packet with a given destination address and port will be forwarded to a certain node in the private realm. This scheme is generally referred to as static port mapping.

Bridging between a private realm and a public realm could also be effectuated on the session level, e.g. as described in [4].

Apparently, there are limitations regarding the number of simultaneous flows that can be supported by the gateway, as well as limitations regarding the mechanisms for establishing a connection initiated from nodes in the public realm.

SUMMARY OF THE INVENTION

None of the existing schemes meets the demands for supporting a massive deployment of a vast number of IP-enabled terminals in future networks, or more generally the demands for efficiently providing connectivity between networks of different address realms.

The present invention overcomes these and other drawbacks of the prior art arrangements.

It is a general object of the invention to provide an improved scheme for providing connectivity between networks of different address realms.

It is particularly important to provide enhanced scalability, for example to enable support of a large number of private nodes by means of a limited number of available public addresses. In other words, it is highly desirable to improve the multiplexation characteristics of a communication gateway.

It is also an object of the invention to provide stable support for flexible so-called outside-realm initiated communication, for example public-realm initiated connections.

Another object of the invention is to provide an improved method and system for establishing a connection between an outside address realm and an inside address realm through an intermediate gateway.

A particular object of the invention is to provide an improved gateway system for efficiently providing connectivity between different address realms.

Yet another object of the invention is to provide a gateway resource manager for supporting enhanced scalability and/or efficient and flexible outside-realm initiated communication.

These and other objects are met by the invention as defined by the accompanying patent claims.

The invention generally concerns the issue of providing connectivity between two different address realms, generally referred to as an inside realm and an outside realm, by establishing connections through an intermediate gateway. The gateway normally has a number of outside-realm gateway addresses for enabling representation of inside-realm nodes in the outside realm. Typically, the inside realm is a private address realm, whereas the outside realm is a public address realm. However, both the inside realm and the outside realm may be different private address realms, or alternatively both realms may be different public domains.

In this respect, it is a challenge to enable outside-realm initiated connections in a flexible and efficient manner. It is also a challenge to be able to support as many connections as possible through the gateway using a limited number of outside-realm addresses, both for inside-realm initiated as well as outside-realm initiated communication.

A basic idea according to a first aspect of the invention is to enable support for flexible outside-realm initiated communication by dynamically establishing new gateway connection states triggered, for each new connection, by a respective user-resource identifier query initiated from a corresponding outside node.

Preferably, an outside node that wants to initiate a new connection to an inside node prepares a user-resource identifier query, such as a DNS (Domain Name Server) query or equivalent, for transfer to a central allocation or addressing mechanism, which determines inside-realm network address information based on the inside node identifier included in the query. The identifier query from the outside node further includes predetermined connection information such as outside node address information and/or inside node port information. This predetermined connection information from the identifier query may then be used as a basis for identifying an outside-realm gateway address suitable for establishing a new dynamic gateway connection state for a flow between the outside node and the inside node through the gateway. The new dynamic gateway connection state is subsequently established at least partly based on the identified outside-realm gateway address, the predetermined connection information from the identifier query and the inside-realm network address information. In this way, the invention provides support for dynamic outside-realm initiated communication.

Examples of a user-resource identifier query include a DNS query, a URI (Universal Resource Identifier) query of the SIP (Session Initiation Protocol) protocol or similar query of a proprietary protocol such as a proprietary peer-to-peer protocol for multimedia communications, file sharing or computer games.

For an outside-realm initiated connection, the dynamic gateway connection state is typically, although not necessarily, established in two steps. First, a partially complete gateway connection state is created based on the identified outside-realm gateway address, the predetermined connection information from the identifier query and the inside-realm network address. Upon receipt of a packet from the outside node, the partially complete gateway state is transformed into a complete gateway connection state based on complementary connection information associated with the packet. The outside node is generally notified of the identified outside-realm gateway address to enable communication of the initial packet in the communication flow to the gateway.

The predetermined connection information used for identifying a suitable outside-realm gateway address may be an outside network address related to the initiating outside node. In this case, the complementary connection information for completing the gateway connection state preferably includes a port number related to the inside node as well as a port number related to the outside node.

As an alternative or as a complement, it has been recognized that it is possible to include information of the port at which the inside node listens for incoming packets, a predefined port or a port made known to the outside node by signaling, in the identifier query from the outside node. This inside node port information can then be used in the identification of an outside-realm gateway address. In this case, the complementary connection information for completing the gateway connection state typically includes an outside network address related to the outside node and an associated port number, or at least the outside node port number.

Advantageously, the task of setting up a new outside-realm initiated connection is functionally divided between the outside node, which sends the initiating identifier query, an identifier-to-address translator, a gateway resource manager and the actual gateway. The gateway resource manager is typically responsive to information such as the determined inside-realm network address corresponding to the relevant inside node and the predetermined connection information originally included in the identifier query, and responsible for identifying a suitable outside-realm gateway address to be used for establishing a new dynamic gateway connection state based on this information. The gateway resource manager finally sends a state set-up request to the gateway, which establishes the dynamic gateway connection state.

A basic idea according to a second aspect of the invention consists in intelligently using additional multiplexation information in the process of setting up new dynamic gateway connection states such that the number of connections that can be simultaneously supported by the gateway can be significantly increased. The additional multiplexation information is generally predetermined connection information that includes network address information and/or port information, and the main objective is to identify further connection information including an outside-realm gateway address based on the given address and/or port information. More particularly, the idea is to identify further connection information that in combination with the predetermined connection information defines an outside-realm gateway state representation that has no counterpart in a predetermined set of existing gateway connection states. By outside-realm gateway state representation is meant the outside-realm part of the overall gateway state representation.

For outside-realm initiated connections, the process of identifying further connection information is preferably performed with the aim to identify an outside-realm gateway address, which in combination with the predetermined connection information defines a partially complete outside-realm gateway state representation that has no counterpart in any existing partially complete gateway connection state. For example, the predetermined connection information is extracted from the identifier query as indicated above. Once such a gateway address has been identified, the gateway connection state is ready to be established based on the partially complete outside-realm representation defined by the outside-realm gateway address and the predetermined connection information. The additional multiplexation information, such as outside node address information and/or inside node port information, makes it possible to distinguish a much larger number of simultaneous connections compared to any of the prior art arrangements. The above process of increasing the multiplexation characteristics of the gateway normally requires a comparison in relation to all partially complete gateway connection states currently existing in the gateway. This comparison could be performed by the gateway resource manager directly in relation to the gateway, requesting and extracting the partially complete gateway states from the gateway as and when required. However, in order to reduce the signaling between the gateway and the resource manager, a separate list representation of existing partially complete gateway connection states is preferably maintained in the resource manager, or at least accessible by the resource manager.

A similar approach for obtaining support for a much larger number of simultaneous connections through the gateway can be applied also for inside-realm initiated connections.

The idea here is to identify, based on predetermined connection information including outside node address information and/or outside node port information, further connection information including an outside-realm gateway address, which in combination with the predetermined connection information defines an at least partially complete outside-realm gateway state representation that has no counterpart in any existing gateway connection state. Establishment of the connection can then be initiated based on the generated outside-realm representation.

For inside-realm initiated connections, the process of increasing the multiplexation characteristics of the gateway typically requires a comparison in relation to all existing gateway connection states, not only in relation to partially complete gateway states as for outside-realm initiated connections.

For so-called substitution style gateways based on address and port translation, the further connection information to be identified may also include associated gateway port information in addition to the outside-realm gateway address. In this case, the resulting outside-realm representation is a complete outside-realm representation, which together with a corresponding inside-realm representation completely defines the new connection through the gateway.

On the other hand, for so-called relaying style gateways, where the inside-realm representation of the gateway state may be a virtual point-to-point interface, the resulting outside-realm representation is only a partially complete representation, which forms the basis for creating a partially complete gateway state. In this case, upon receipt of a packet from the inside node, it is normally recommended to check that the partially complete representation in further combination with inside node port information associated with the received packet defines a unique complete outside-realm representation that can be used for completing the gateway connection state.

The multiplexation gain offered by the invention is truly significant, leading to a support for a considerably larger number of simultaneous connections compared to any of the prior art schemes. In fact, the invention and the advantages it offers may even render a fast introduction of the IPv6 protocol completely unnecessary.

The invention, in all its aspects, is applicable to any suitable communication gateway known to the art, ranging from NAT-based gateways, or more generally substitution style gateways to RSIP-based gateways, or more generally relaying style gateways.

The invention offers the following advantages:

Dynamic, flexible and efficient outside-realm initiated communication.

Efficient use of user-identifier queries, such as DNS-queries, in the overall process of establishing outside-realm initiated connections.

Improved gateway multiplexation characteristics.

Support for a much larger number of simultaneous connections through the gateway compared to prior art gateways, both for outside-realm and inside-realm initiated connections.

Enhanced scalability, for example to enable support of a large number of private nodes by means of a limited number of available public addresses.

Generally applicable to most types of gateways.

Other advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS OF THE INVENTION

Figure 1:
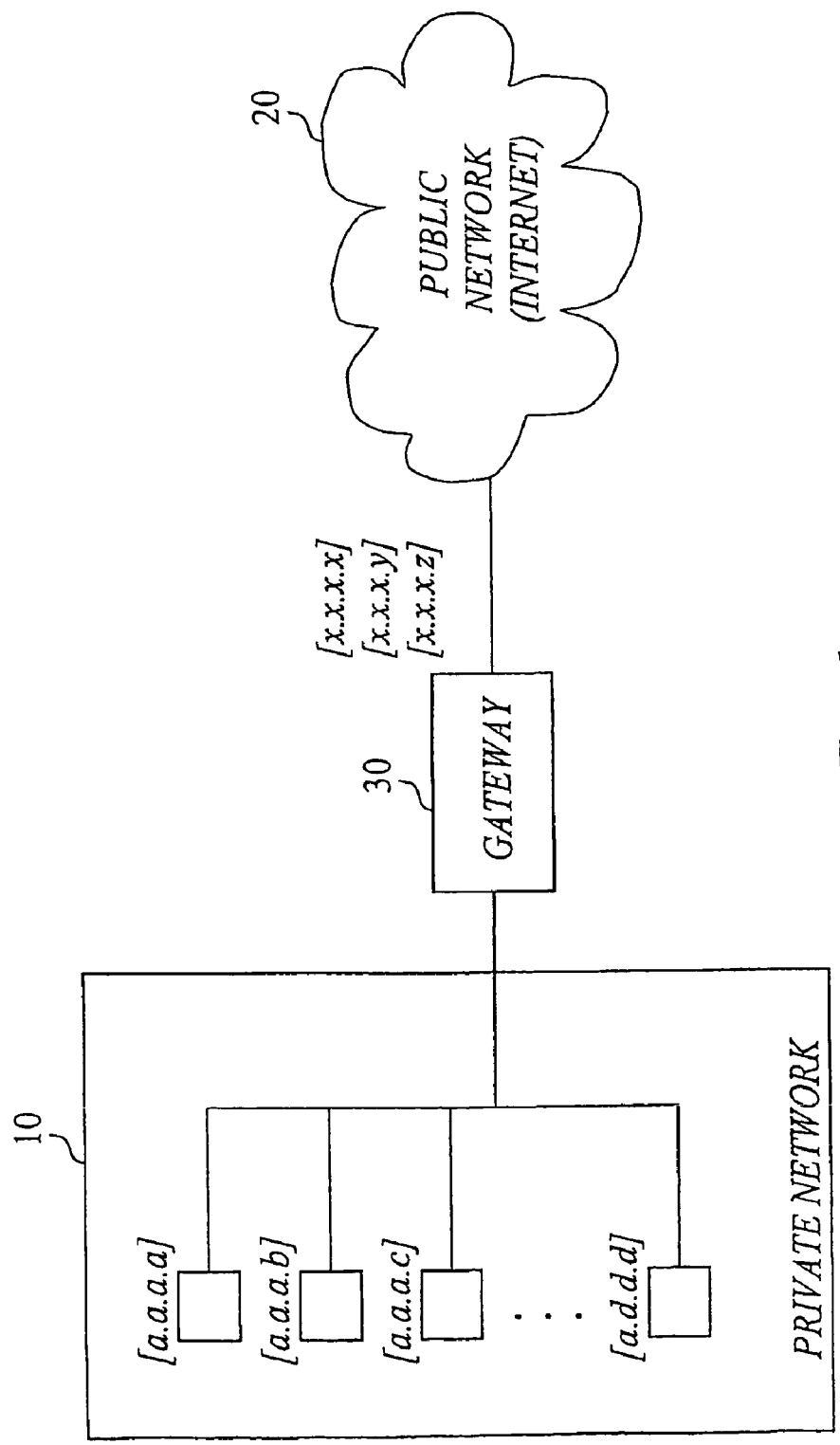
FIG. 1 is a schematic diagram illustrating a gateway interconnecting a private network and a public network.

Throughout the drawings, the same reference characters will be used for corresponding or similar elements.

General Overview

In general, there is a demand for providing connectivity between different address realms, more generally referred to as an outside realm and an inside realm. To this end, there is normally provided an intermediate gateway, which has a number of outside-realm gateway addresses for enabling outside-realm representation of inside-realm nodes. In many practical applications, the inside realm is a private address realm [5], whereas the outside realm is a public address realm. In other applications, however, the inside realm and the outside realm may be different private address realms, or alternatively different public domains.

In this respect, a public realm network is generally a network having communication nodes together with an associated network address space consisting of globally unique network addresses. A private realm network on the other hand is a network having nodes together with an associated network address space consisting of possibly non-unique network addresses, in the sense that two nodes in different instances of a private realm may be assigned the same network address.

A gateway is generally a network element that is connected to both an inside realm and an outside realm. As previously mentioned, there are different types of gateways, especially substitution style gateways (including different flavors of NAT) and relaying style gateways (including different flavors of RSIP). It should also be understood that the overall gateway function includes not only layer 4 packet forwarding, but could encompass packet forwarding on any network layer including also layer 3 packet forwarding.

Figure 2:
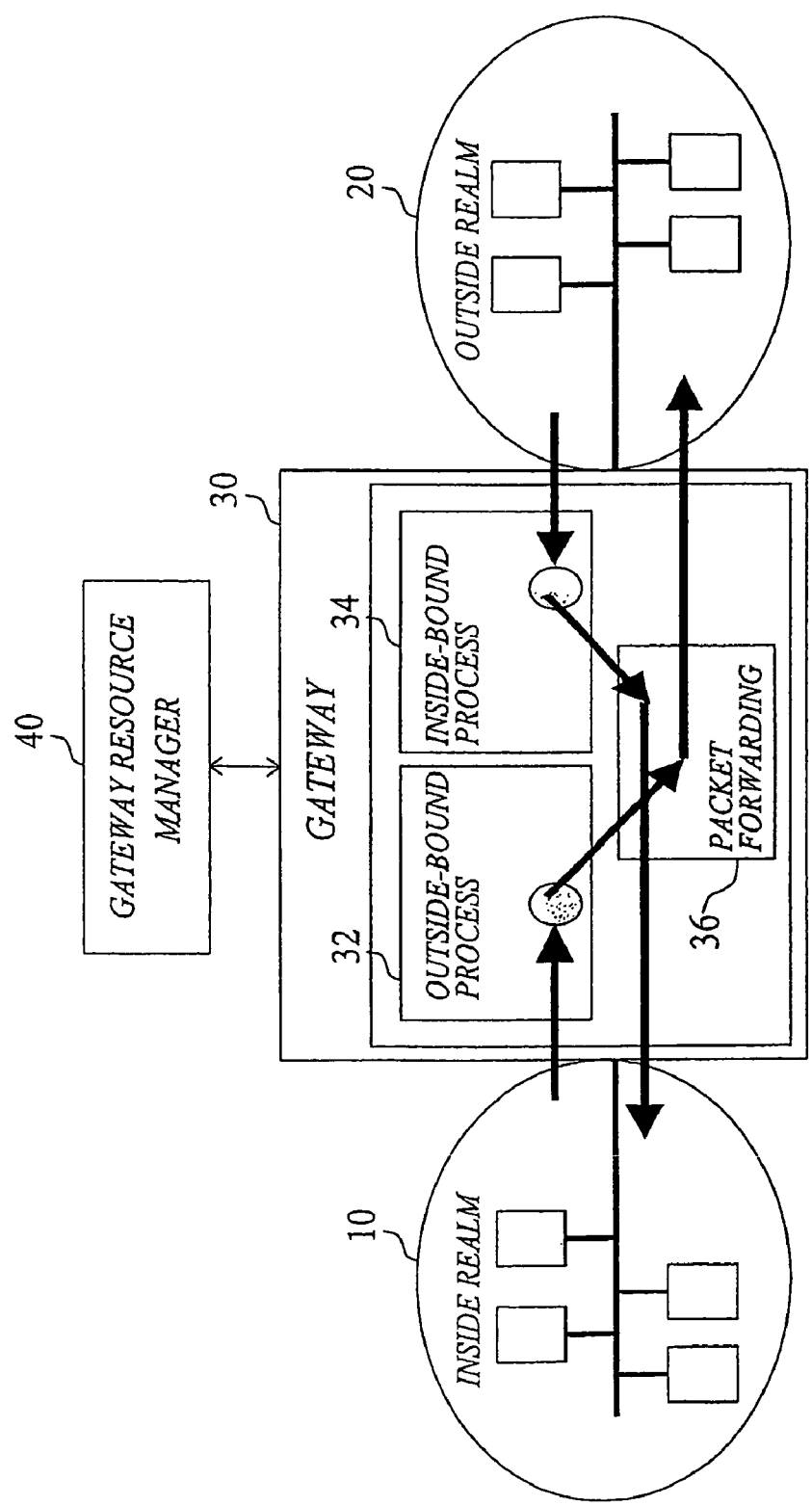
FIG. 2 illustrates a basic model of an exemplary gateway providing connectivity between an inside-realm network and an outside-realm network.

For a better understanding of the invention, it may be useful to begin with a brief introduction of a basic model of an exemplary gateway providing connectivity between an inside realm and an outside realm, referring to FIG. 2.

FIG. 2 illustrates a basic model of an exemplary gateway 30 interconnecting an inside realm 10 and an outside realm 20. The gateway 30 is associated with a gateway resource manager 40, which among other things manages the pool of outside-realm network addresses that have been allocated to the gateway. In the gateway 30, the basic gateway functions are supported by an outside-bound process element 32, an inside-bound process element 34 and a packet forwarding element 36. The gateway 30 and gateway resource manager 40 may be implemented in separate, but interconnected nodes. Alternatively, the gateway resource manager 40 may be co-located with the gateway 30, even integrated in the gateway.

For a substitution style gateway, as the name indicates, substitution of address and port information in the packet headers is performed to enable proper packet forwarding. A gateway connection state in a substitution style gateway is normally represented by an outside n-tuple and an inside n-tuple. In general, an n-tuple is a set of n information elements that typically include: (a source network address, a source port number, a destination network address, a destination port number, a protocol number). An outside n-tuple is typically an n-tuple with the source and destination network addresses belonging to the outside realm. An inside n-tuple is typically an n-tuple with the source network address belonging to the inside realm and the destination network address belonging to the outside realm. To enable proper packet forwarding for communication flows, there are two basic classification processes:

The inside-bound process, in which each inside-bound packet is matched against the outside n-tuples of the gateway connection states in the gateway, and when finding a matching outside n-tuple, the destination address and port of the packet header are substituted with the source address and port of the inside n-tuple corresponding to the identified outside n-tuple.

The outside-bound process, in which each outside-bound packet is matched against the inside n-tuples of the gateway connection states in the gateway, and when finding a matching inside n-tuple, the source address and port of the packet header are substituted with the destination address and port of the outside n-tuple corresponding to the identified inside n-tuple.

For a relaying style gateway, a gateway connection state is normally represented by an outside n-tuple and a virtual point-to-point interface towards a communication node on the inside realm. An example of a virtual point-to-point interface is an IP-in-IP tunnel in which, in the inside-bound direction, a packet is encapsulated in another packet, with destination address equal to the inside node address, and source address equal to the inside gateway address, and in the outside-bound direction the incoming packet is decapsulated, whereby an inner packet is extracted. In another example, instead of encapsulation and decapsulation, there could be a layer 2 point-to-point link between the gateway and the communication node on the inside realm (for example, in a GPRS system, the PDP Context layer).

In a relaying style gateway, the two basic processes for enabling proper packet forwarding for communication flows are defined as:

The inside-bound process, in which each inside-bound packet is matched against the outside n-tuples of the gateway connection states in the gateway, and when finding a matching outside n-tuple, the packet is sent to the virtual point-to-point interface corresponding to the identified outside n-tuple.

The outside-bound process, in which each outside-bound packet comes in on a virtual point-to-point interface and forwarded by the gateway to the outside realm.

The main difference between substitution and relaying style is that in relaying style, the inside node is aware of the currently allocated outside-realm address (and port number(s)). In substitution style, the inside-realm node is not aware of the outside-realm address, and instead the gateway performs transparent translation (substitution).

In both substitution and relaying style gateways, there may be partially complete gateway connection states, i.e. states which represent connections that currently are in the process of being established, but which have not yet collapsed into a complete gateway connection state for a gateway session. Such partially complete gateway states are sometimes referred to as gateway gates or pinholes.

In a substitution style gateway, a gateway gate is a gateway connection state with an outside n-tuple and an inside n-tuple, where the outside n-tuple and/or the inside n-tuple has one or more unspecified connection variables (wild cards, denoted by "*"). When the gateway receives an inside-bound packet/outside-bound packet matching the specified values of the partially complete outside/inside n-tuple, that n-tuple is completed in the sense that the up-to-now unspecified values of the partially complete n-tuple are fixed to the corresponding values associated with the packet.

In a relaying style gateway, a gateway gate is a gateway connection state with an outside n-tuple and an inside n-tuple, where the outside n-tuple and/or the inside n-tuple has one or more unspecified connection variables. When the gateway receives an inside-bound packet matching the specified values of the partially complete outside n-tuple, that n-tuple is completed in the sense that the up-to-now unspecified values of the partially complete n-tuple are fixed to the corresponding values associated with the packet.

An outside n-tuple is generally also referred to as an outside-realm gateway state representation, since it refers to the part of the overall gateway state representation that is related to the outside realm.

With the above basic insights into the operation of a general gateway, the understanding of the sometimes rather complex aspects of the invention will now be somewhat facilitated and more straightforward.

As previously mentioned, it is a basic challenge to enable outside-realm initiated connections in a flexible and efficient manner. It is also highly desirable to improve the multiplexation characteristics of the gateway, both for inside-realm initiated as well as outside-realm initiated communication. The main objective in the latter respect is to be able to support as many connections as possible through the gateway using a limited number of outside-realm addresses.

Exemplary Basic Procedures for Outside-Realm Initiated Communication

Figure 3:
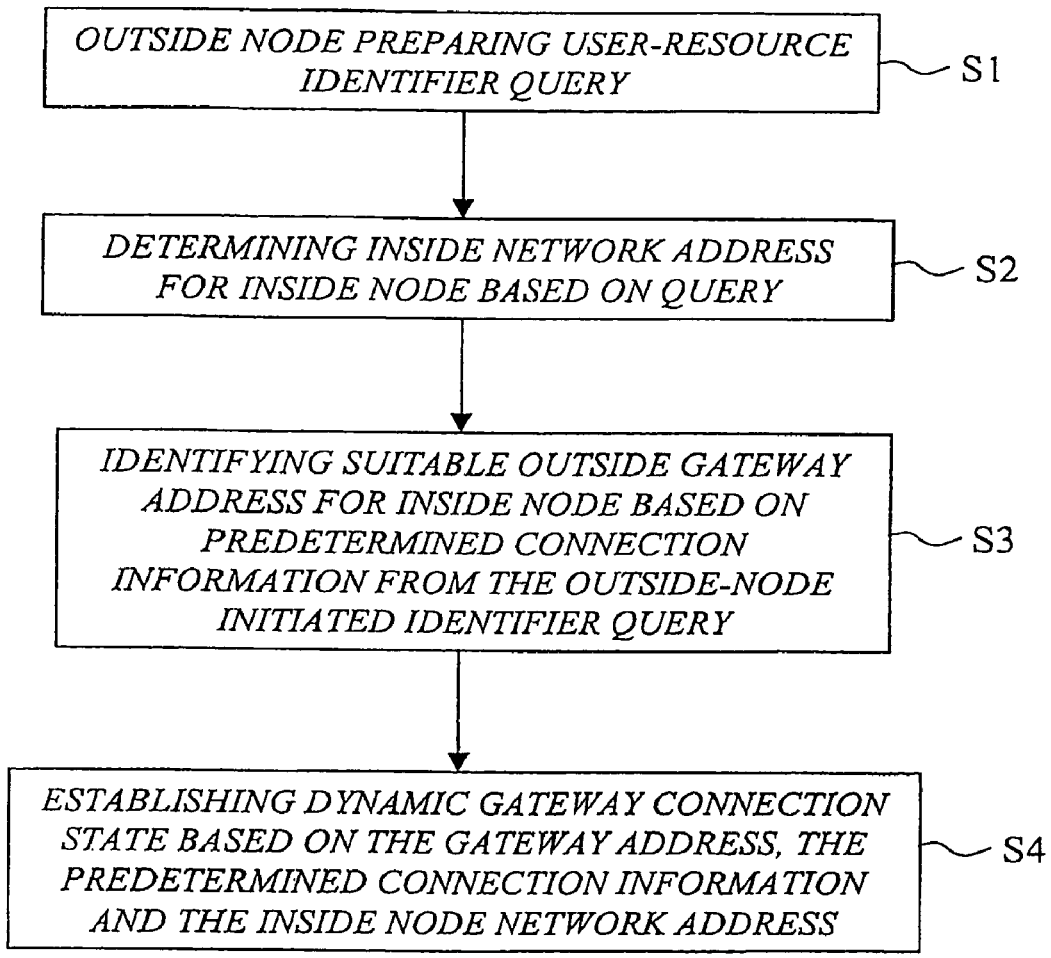
FIG. 3 is a schematic flow diagram of a method for enabling support for flexible outside-realm initiated communication according to a preferred embodiment of the invention.

The inventors have recognized that a flexible and dynamic mechanism for enabling outside-realm initiated communication is obtained by letting a user-resource identifier query, such as a DNS-query or equivalent query, initiated from an outside node trigger the set-up of a connection state in the gateway. A basic procedure according to a preferred embodiment of the invention is generally outlined in the flow diagram of FIG. 3. In step S1, an outside node that wants to initiate a new connection to a particular inside node prepares a user-resource identifier query, such as a DNS query or equivalent, for transfer to a central allocation or addressing mechanism. In step S2, an inside-realm network address is determined for the inside node based on an inside node identifier included in the query. In the case of a DNS-query, this may for example be accomplished by a conventional domain-name-to-network-address translator. The identifier query further includes predetermined connection information that is handled by a gateway resource manager, which uses this information as a basis for identifying an outside-realm gateway address suitable for establishing a new dynamic gateway connection state, as indicated in step S3. The predetermined connection information may for example be the network address of the outside node or inside node port information. In the latter case, the port information may be a pre-defined inside node receiver port, or a receiver port number made known to the outside node by explicit signaling. Next, in step S4, the new dynamic gateway connection state for a flow between the outside node and the inside node through the gateway is established at least partly based on the identified outside-realm gateway address, the predetermined connection information and the inside-realm network address. This means that the invention provides support for dynamic outside-realm initiated communication. Among other things, this allows all forms of push services, notification services and instant messaging services.

For an outside-realm initiated connection, the dynamic gateway connection state is typically, although not necessarily, established in two steps. First, a partially complete gateway connection state is created based on the identified outside-realm gateway address, the predetermined connection information extracted from the identifier query as well as the inside network address. Upon receipt of a packet from the outside node, the partially complete gateway state "collapses" into a complete gateway connection state as complementary connection information such as address and/or port information in the packet header is used to fill-in the unspecified parts of the gateway state. The outside node is generally notified of the identified outside-realm gateway address to enable communication of the initial packet towards the gateway.

Improved Gateway Multiplexation Capacity

In a further aspect of the invention, the number of outside-realm initiated connections that can be simultaneously supported by the gateway can be significantly increased by intelligently using one or more additional multiplexation variables in the process of setting up new dynamic gateway connection states. Here, the additional multiplexation information preferably includes the predetermined connection information, typically outside node address information and/or inside node port information, as extracted from the initiating user-resource identifier query. However, from the viewpoint of the gateway resource manager, the origin of the predetermined connection information to be used in the state set-up process is not critical, as long as it receives proper connection information.

Figure 4:
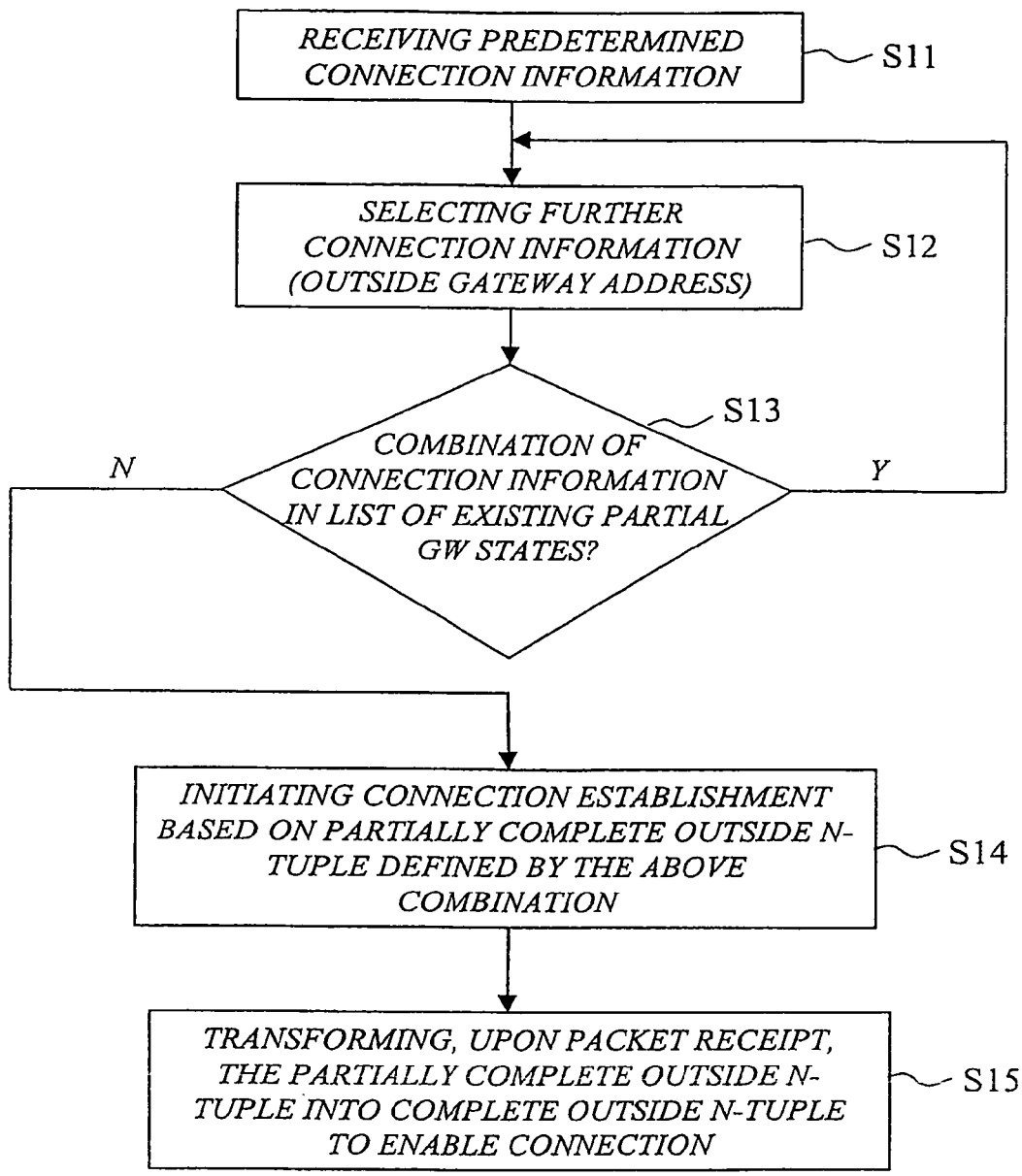
FIG. 4 is a schematic flow diagram of a basic method for improving the gateway multiplexation characteristics for outside-realm initiated communication according to a preferred embodiment of the invention.

FIG. 4 is a schematic flow diagram of a basic method for improving the gateway multiplexation characteristics for outside-realm initiated communication according to a preferred embodiment of the invention. In the following, an outside-realm gateway address is simply referred to as an outside gateway address.

As indicated in step S11, the exemplary method involves receiving predetermined connection information to be used in the state set-up process. For a substitution style gateway, further connection information, typically an outside gateway address, is selected in step S12. In order to avoid a gateway resource clash between several simultaneous on-going connection set-ups, the partially complete outside n-tuple, defined by a combination of the outside gateway address and the predetermined connection information, is analyzed in comparison to all existing partially complete gateway connection states, as indicated in step S13. The analysis includes checking whether the above combination of connection information, defining a partially complete outside n-tuple, has any counterpart in the existing partially complete gateway connection states. If the partially complete outside n-tuple is already present (Y) in an existing partially complete gateway state, there is already a binding between the outside gateway address and the predetermined connection information. This generally means that another outside gateway address has to be selected from the gateway address pool, repeating steps S12-S13. The gateway resource manager repeats the process with the next address in the outside gateway address pool until a "free" address is found or the end of the address pool is reached. If it is possible to identify an outside gateway address, which in combination with the predetermined connection information has no counterpart in any existing partial gateway state (N), the procedure continues with step S14. In step S14, connection establishment is initiated based on the partially complete outside n-tuple (and naturally also the corresponding inside representation), awaiting completion in step S15 upon receipt of the first packet in the communication flow.

If all outside gateway addresses in the address pool has been traversed without finding a unique partial outside n-tuple, the connection request may have to be rejected. It is however also possible to start traversing the addresses in gateway address pool once again, assuming that the delay of the mentioned selection procedure should minimize the risk of two connections being set-up simultaneously so that any existing data connection establishment should have had time to be completed upon receipt of the first packet.

As mentioned above, when the first packet arrives, the partial gateway state turns into a complete gateway connection state. Complete gateway connection states can be further distinguished by complementary connection information associated with the corresponding packets, and so do not have to be represented in the list used in step S13. Therefore, as soon as there is a complete binding, when a partial gateway state turns into a complete gateway state, that partial gateway state is removed from the list of ambiguity candidates.

The above process of increasing the multiplexation characteristics of the gateway apparently requires a comparison in relation to all partially complete gateway connection states currently existing in the gateway. This comparison could be performed by the gateway resource manager directly in relation to the gateway, requesting and extracting the partially complete gateway states from the gateway as and when required. However, in order to reduce the signaling between the gateway and the resource manager, a separate list representation of existing partially complete gateway connection states is preferably maintained in the resource manager, or at least accessible by the resource manager.

For relaying style gateways, it should be understood that the inside-realm nodes are generally aware of the outside-realm addresses they are using, meaning that such outside-realm addresses have typically been pre-allocated to the inside nodes. This means that for relaying style gateways, step S12 is performed earlier in the overall chain of events, and that step S13 becomes more of a check whether the combination of a pre-allocated outside gateway address and received predetermined connection information has any counterpart among the existing partially complete gateway states.

Exemplary Scenarios

For example, consider public host B that wants to connect to two private nodes A1 and A2. Host B initiates a connection set-up towards node A1, and the gateway resource manager finds a free outside gateway address, say aOG1. Simultaneously, host B initiates a connection set-up towards node A2, and the gateway resource manager attempts to identify a useful outside gateway address. By using inside node receiver port information in the gateway address identification process, it is possible, assuming that private nodes A1 and A2 do listen on different port numbers, to assign the same public gateway address, aOG1, for pending connections towards both private nodes A1 and A2, since now the two pending connections can be distinguished based on the destination port information pA1 and pA2. Consequently, this means that each public gateway address can be used for any number of private nodes, as long as they all listen on different port numbers.

Assume furthermore that public host B wants to initiate connections to yet another private node A3, listening on the same port number as node A1. Provided that the connection between host B and node A1 has already been completely established when host B initiates a connection set-up towards node A3, it is actually safe to select the same public gateway address for node A3, since it can be safely assumed that host B will use different port numbers when sending traffic towards the private nodes A1 and A3. The port number of public host B is appended as source port information in the packet header, and can be used as complementary connection information for distinguishing a given packet flow from other flows from B.

In another example, consider two public hosts B1 and B2, each wanting to connect the same private network hidden behind a gateway. Host B1 initiates a connection set-up, and the gateway resource manager finds a free public gateway address, say aOG1. Simultaneously, host B2 initiates a connection set-up, and the gateway resource manager attempts to identify a useful public gateway address. By using the public host address in the process of identifying a useful outside gateway address, the same gateway address can be selected for host B2, since the two pending connections can be distinguished based on the source address information, aOB1 and aOB2. In general, this in fact means that each public gateway address can be used for any number of different public hosts.

Assume furthermore that public host B1 wants to initiate connections to two different private nodes A1 and A2. Provided that the connection between host B1 and node A1 has already been completely established when host B1 initiates a connection set-up towards node A2, it is actually safe to select the same public gateway address for node A2, since it can be safely assumed that host B1 will use different port numbers when sending traffic towards the private nodes A1 and A2. The port number of public host B1 is appended as source port information in the packet header, and can be used as complementary connection information for distinguishing a given packet flow from other flows from B1. This even allows private nodes A1 and A2 to listen on the same port number. It is a clear advantage to be able to allow the application software in the private nodes to choose port freely.

Lower Complexity Implementation

If a lower degree of implementational complexity is desired, with a lower impact on existing gateway implementations, it is possible to eliminate the step-wise state set-up and establish a complete gateway connection state directly based only on the available connection information before packet reception. In a preferred lower-complexity implementation, the gateway resource manager requests allocation of a public gateway address to a given private node, but only for traffic coming from a particular public host, still keeping the public gateway address available for traffic to the same or other private nodes from other public hosts. Naturally, the drawback is that for flows coming from one particular public host, the number of private nodes that can simultaneously receive information is limited to the number of available public gateway addresses. However, flows originating from different public hosts can still be allocated the same public gateway address.

Exemplary Basic Procedures for Inside-Realm Initiated Communication

Improved Gateway Multiplexation Capacity

Figure 5:
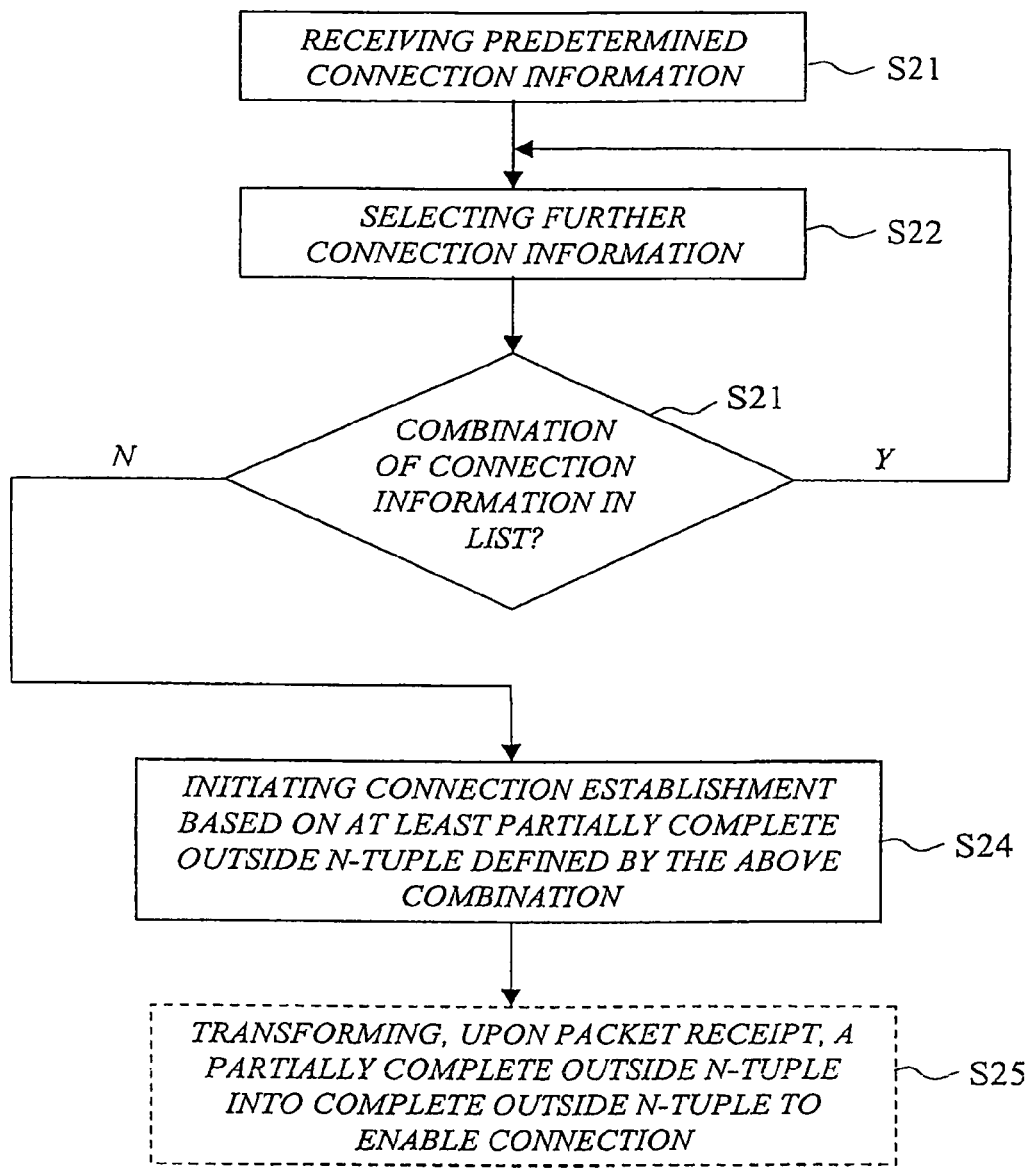
FIG. 5 is a schematic flow diagram of a basic method for improving the gateway multiplexation characteristics for inside-realm initiated communication according to a preferred embodiment of the invention.

A similar approach for supporting a much larger number of simultaneous connections through the gateway can be applied also for inside-realm initiated connections, as generally outlined in the basic flow diagram of FIG. 5. In step S21, predetermined connection information including outside node address information and/or outside node port information, is received by the gateway resource manager. For a substitution style gateway, further connection information including at least an outside gateway address is selected in step S22. In step S23, it is tested whether the combination of the predetermined connection information and the further connection information, together defining an at least partially complete outside-realm representation of a new gateway connection state to be established, has any counterpart in the existing gateway connection states. If the at least partially complete outside n-tuple is already present (Y) in an existing gateway state, another outside gateway address has to be selected from the gateway address pool, repeating steps S22-S23. The gateway resource manager repeats the process with the next address in the outside gateway address pool until a "free" address is found or the end of the address pool is reached. If it is possible to identify an outside gateway address, which in combination with the predetermined connection information defines an at least partially complete outside n-tuple that has no counterpart in any existing gateway state (N), the procedure continues with step S24. In step S24, connection establishment is initiated based on the at least partially complete outside n-tuple (and naturally also the corresponding inside representation).

It should be especially noted that, for inside-realm initiated connections, a comparison in relation to all existing gateway connection states is typically required, not only in relation to partially complete gateway states as for outside-realm initiated connections.

For so-called substitution style gateways based on address and port translation, the further connection information to be identified may also include associated gateway port information in addition to the outside gateway address. In this case, the resulting outside-realm representation is a complete outside-realm representation, which together with a corresponding inside-realm representation completely defines the new connection through the gateway.

On the other hand, for so-called relaying style gateways, where the inside-realm representation of the gateway state may be a virtual point-to-point interface, the resulting outside-realm representation is normally only a partially complete representation. This partially complete outside-realm representation forms the basis for creating a partially complete gateway state, which is subsequently transformed into a complete gateway state upon receipt of the first packet from the inside node. In addition, as previously mentioned, for relaying style, the inside-realm nodes are generally aware of the outside-realm addresses they are using, which means that outside-realm addresses have already been pre-allocated.

The Gateway Resource Manager

Figure 6:
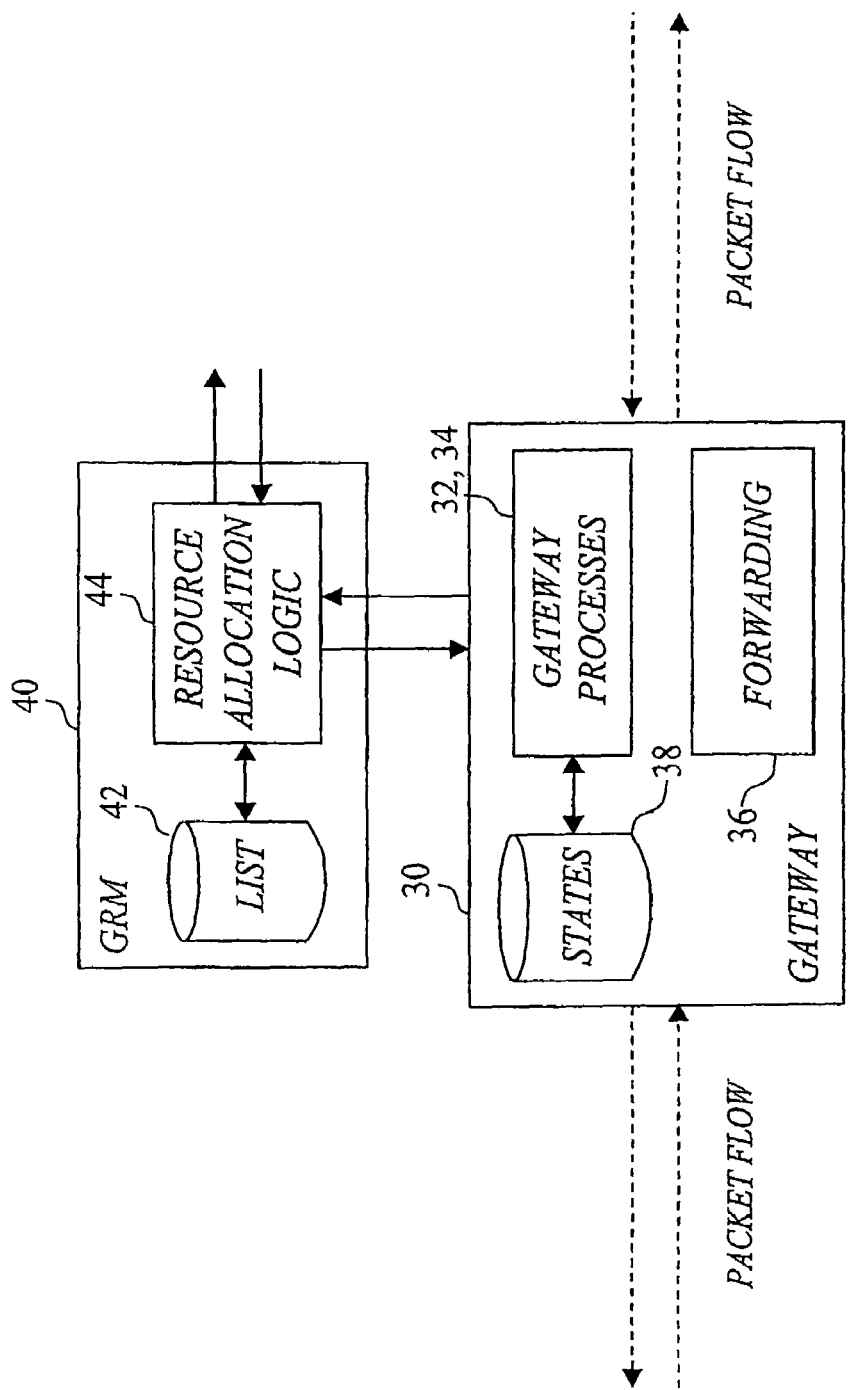
FIG. 6 is a schematic diagram of an exemplary gateway system, including a gateway and an associated gateway resource manager, providing effective support for improved gateway multiplexation characteristics.

The above processes of increasing the multiplexation characteristics of the gateway in order to be able to distinguish a much larger number of simultaneous connections compared to any of the prior art systems, apparently requires a comparison in relation to various sets of gateway connection states currently existing in the gateway. Referring to the simplified block diagram of FIG. 6, this comparison could be performed by the gateway resource manager 40 directly in relation to the gateway 30, requesting and extracting the relevant gateway states from a state database 38 in the gateway as and when required. However, in order to reduce the signaling between the gateway 30 and the resource manager 40, the analysis is preferably performed in relation to one or more separate list representations of the relevant gateway connection states. This list representation 42 is conveniently maintained in the resource manager 40, or at an external location that makes it possible for resource allocation logic 44 in the resource manager to effectively access the information.

In general, the resource manager may be implemented as software, hardware, firmware or any combination thereof. In the case of a software-implementation, the steps, functions and actions related to the resource manager are mapped into a computer program, which when being executed by a computer or equivalent processing system effectuates the relevant resource allocation.

Sequence Diagrams for Inside-realm Initiated Communication

For a more detailed understanding of the invention, the invention will now be described with reference to exemplary signal sequence diagrams. For simplicity, we will start with inside-realm initiated communication.

Substitution Style

Figure 7:
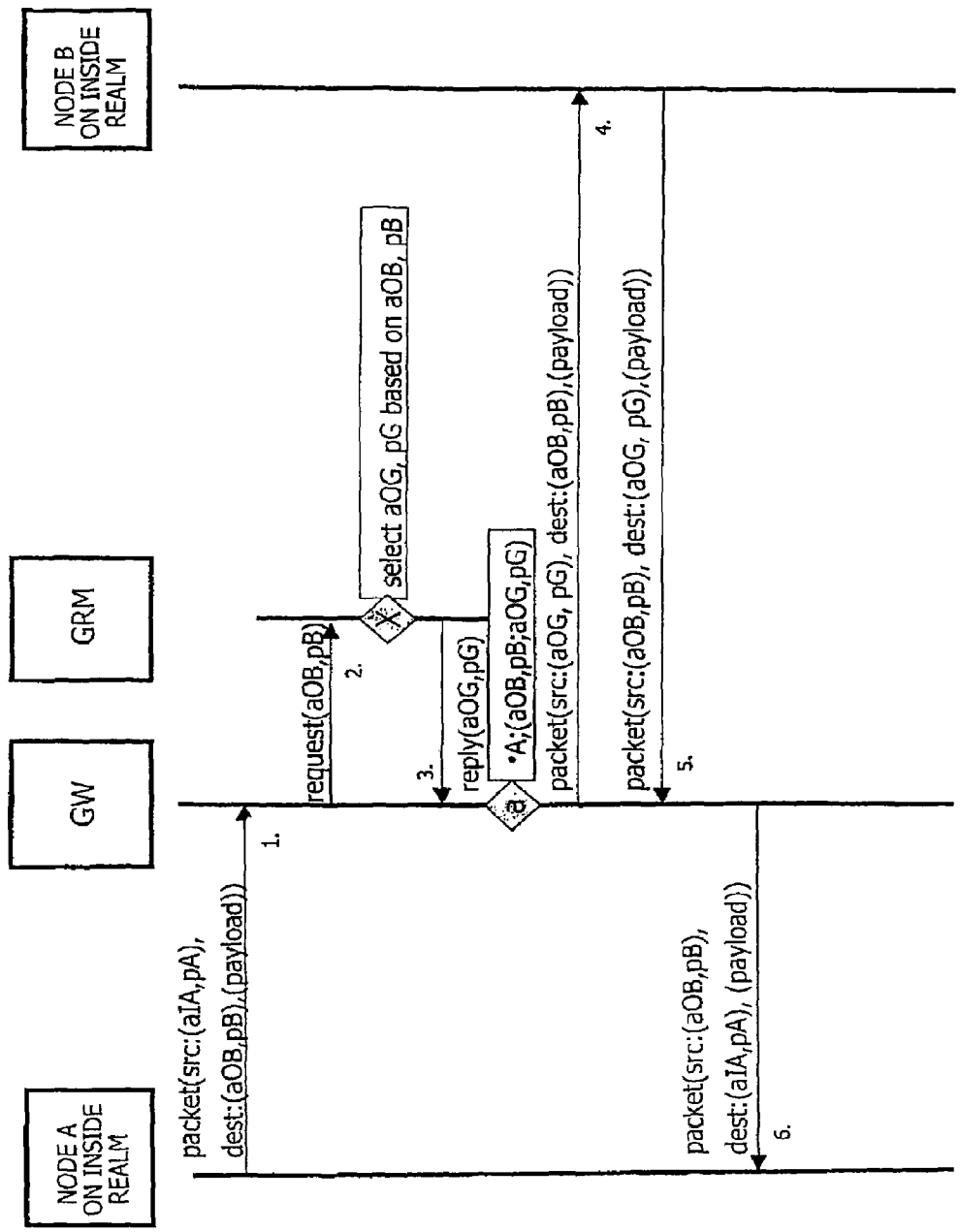
FIG. 7 is a schematic sequence diagram illustrating the relevant signaling between the involved elements for an illustrative example of inside-realm initiated communication through a substitution style gateway.

FIG. 7 is a schematic sequence diagram illustrating the relevant signaling between the involved elements for an illustrative example of inside-realm initiated communication through a substitution style gateway. The gateway (GW) can enable communication initiated from a node A on the inside realm towards a node B on the outside realm. It is assumed that node A has obtained information of the destination network address aOB, typically through a conventional DNS-query based on a FQDN. The destination port number pB may be a well-known port number, or made known by explicit signaling. An exemplary sequence for supporting a communication flow between A and B through the gateway could be:

1. Node A has the network address aIA and chooses the source port (ephemeral port) pA. The gateway (GW) receives the first packet in a certain communication flow initiated from the inside realm.
2. The gateway sends a request including the destination network address aOB and/or port number pB to the gateway resource manager (GRM).
    In process X, the gateway resource manager allocates a network address aOG from the gateway address pool and given that address preferably also a port number pG from the gateway port pool based on the destination address aOB and/or destination port pB.
    The gateway typically supplies the destination address and/or destination port as predetermined connection information to the gateway resource manager, which investigates whether there is a binding between the next gateway address in the gateway address pool and the destination address and/or destination port. If such a binding exists, the resource manager repeats the process with the next gateway address in the pool until a free gateway address without binding is found (or the end of the gateway address pool is reached).
    In this particular example, the GRM manager executes an algorithm that attempts to select aOG and pG so that the outside n-tuple (src:(aOB, pB); dest:(aOG, pG); . . . ) is not an outside n-tuple of an already existing gateway connection state.
3. The allocated gateway address aOG and the associated port number pG are sent back to the gateway.
    In process a, the gateway creates a new gateway connection state based on the available connection information. The inside n-tuple gets the values: (aIA, pA; aOB, pB) and the outside n-tuple gets the values: (aOB, pB; aOG, pG).
4. The packet is processed in the gateway by the outside-bound process, and forwarded through the gateway to the outside-realm node B.
5. A reply packet in the communication flow is received by the gateway from node B.
6. The reply packet is processed by the inside-bound process, and delivered to the inside-realm node A.

The multiplexation capacity is improved beyond the limitations of the prior art, and the number of flow can be greater than (number of network address in the gateway address pool)·(number of usable ports).

Relaying Style

Figure 8:
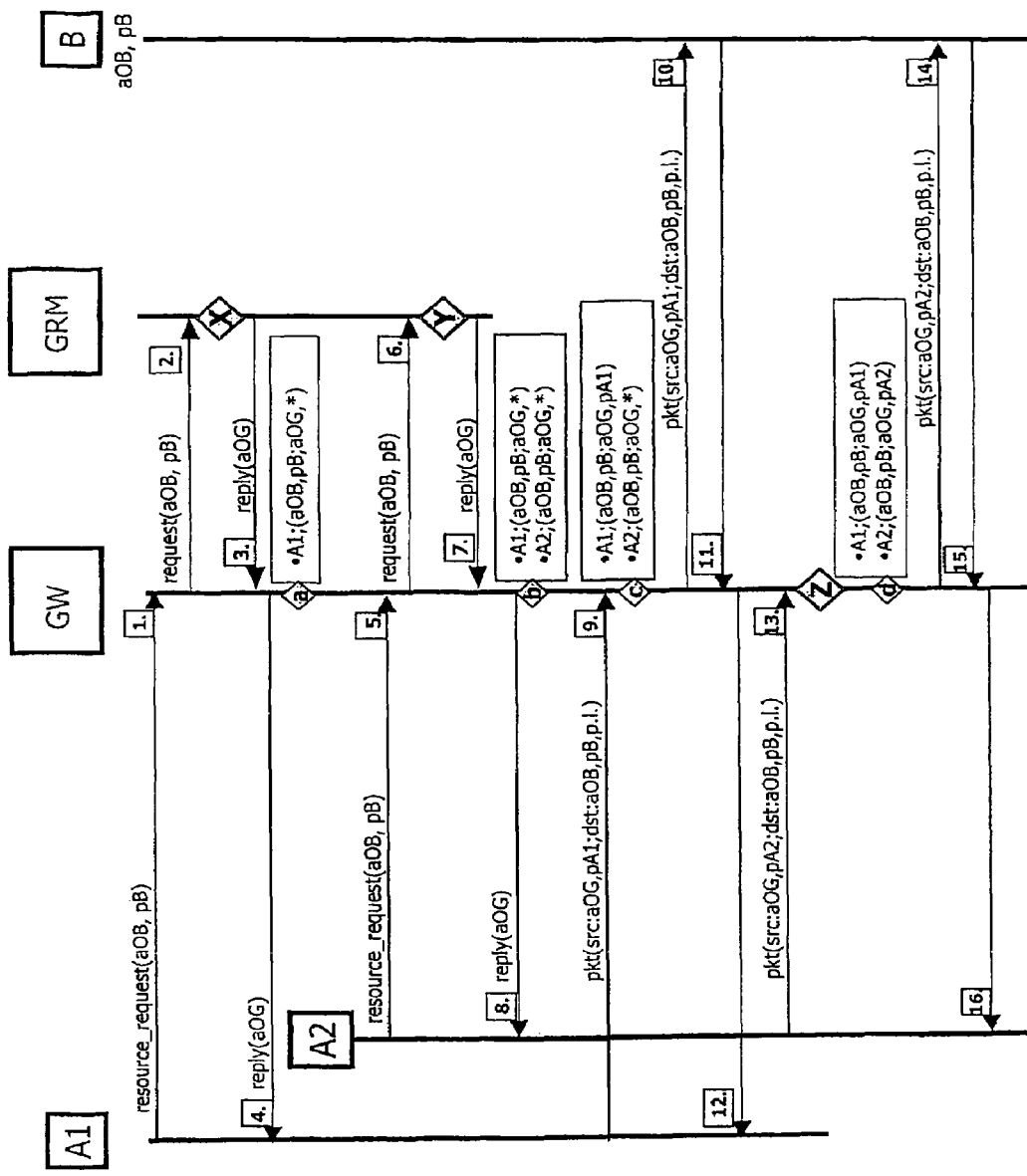
FIG. 8 is a schematic sequence diagram illustrating the relevant signaling between the involved elements for an illustrative example of inside-realm initiated communication through a relaying style gateway.

FIG. 8 is a schematic sequence diagram illustrating the relevant signaling between the involved elements for an illustrative example of inside-realm initiated communication through a relaying style gateway.

For relaying style it is desirable, although not necessary, to avoid the port granularity alternative by ensuring sufficient port multiplexing for the address granularity alternative. Especially in the case of communication initiated in the outside realm, as described later on with reference to FIGS. 12 and 13, the receiving inside node should preferably be able to choose port number freely. This is not satisfied in the port granularity alternative. Therefore, in the following we mainly refer to the address granularity alternative when discussing the relaying style option.

An exemplary sequence for supporting a communication flow from inside nodes A1 and A2 to outside node B through the gateway could be:

1. Node A1 wants to initiate a communication flow towards node B, which belongs to the outside realm. Node A1 sends a request including the destination network address aOB and port number pB to the gateway (GW). In the IETF RSIP framework (RFC3103), this message could be the "ASSIGN_REQUEST_RSA-IP".
2. The gateway sends a request to the gateway resource manager (GRM).

In process X, the GRM manager allocates a network address aOG from the gateway address pool.

The gateway typically supplies the destination address and/or destination port as predetermined connection information to the gateway resource manager. In this example, both destination address information and port information are included in the request. To improve the multiplexing capacity, the gateway resource manager executes an algorithm that given aOB and pB attempts to select aOG so that outside n-tuple (src:(aOB, pB); dest: (aOG, *); . . . ) is not an outside n-tuple of an already existing gateway connection state. If that is not possible (all possible gateway addresses aOG are already used), select the gateway address that is utilized in the least number of gateway connection states.
3. The allocated gateway address aOG is sent back to the gateway.
4. In process a, the gateway creates a new partially complete gateway connection state based on the available connection information. The inside-realm representation is denoted by A1 and represents a virtual point-to-point link to the inside node A1, whereas the outside n-tuple gets the values: (aOB, pB; aOG, *). The "*" means that this field is for the time being unspecified.

A reply is sent back to node A1, including the allocated gateway address aOG.
5. Node A2 also wants to initiate a communication flow towards node B, and sends a request including the destination network address aOB and port number pB to the gateway (GW).
6. The gateway sends a corresponding request to the gateway resource manager (GRM).

In process Y, the GRM manager allocates a network address aOG from the gateway address pool, preferably by using the same algorithm as in process X described above. Assume, for illustrative reasons, that all gateway addresses in the gateway address pool have been traversed without finding a completely "free" address, forcing the resource manager to select the least utilized gateway address. In this example, further assume that the least utilized address is the same address aOG that was previously allocated to node A1.
7. The allocated gateway address aOG is sent back to the gateway.
8. In process b, the gateway creates a further partially complete gateway connection state. The inside-realm representation is denoted by A2 and represents a virtual point-to-point link to the inside node A2, whereas the outside n-tuple gets the values: (aOB, pB; aOG, *). The "*" means that this field is for the time being unspecified.

A reply is sent back to node A2, including the allocated gateway address aOG.
9. Node A1 selects a source port pA1 (a so-called ephemeral port) for the communication flow, and sends the first packet. This packet is received by the gateway.

In process c, the corresponding partially complete outside n-tuple collapses into a complete outside n-tuple (aOB, pB; aOG, pA1), whereby the up-to-now unspecified value in the outside n-tuple is filled-in with the value pA1.
10. The packet is processed by the outside-bound process, and forwarded through the gateway to the outside-realm node B.
11. A reply packet in the communication flow is received by the gateway from node B.
12. The packet is processed by the inside-bound process of the gateway and delivered to node A1.
13. Node A2 selects a source port pA2 (a so-called ephemeral port) for the communication flow, and sends the first packet. This packet is received by the gateway.

In process Z, it is investigated whether pA2 is equal to pA1. If pA2=pA1, there is a collision and the second partially complete gateway connection state (in box c) should not be collapsed. Instead, the gateway should preferably try to influence node A2 to select another pA2 by resetting the communication flow, e.g. by sending a TCP reset signal.

Assuming that pA2 differs from pA1, the partially complete outside n-tuple collapses in process d into a complete outside n-tuple (aOB, pB; aOG, pA2), whereby the up-to-now unspecified value in the outside n-tuple is filled-in with the value pA2.
14. The packet is processed by the outside-bound process, and forwarded through the gateway to the outside-realm node B.
15. A reply packet in the communication flow is received by the gateway from node B.
16. The packet is processed by the inside-bound process of the gateway and delivered to node A2.

The multiplexing capacity can be increased to a point where the address granularity alternative can be used instead of the port granularity alternative. This means that arbitrary ephemeral port numbers can be used.

In the following, the invention will be described with reference to outside-realm initiated communication triggered by a DNS-query or equivalent user-resource identifier query.

Exemplary Basic Block Diagram for Outside-Realm Initiated Communication

Figure 9:
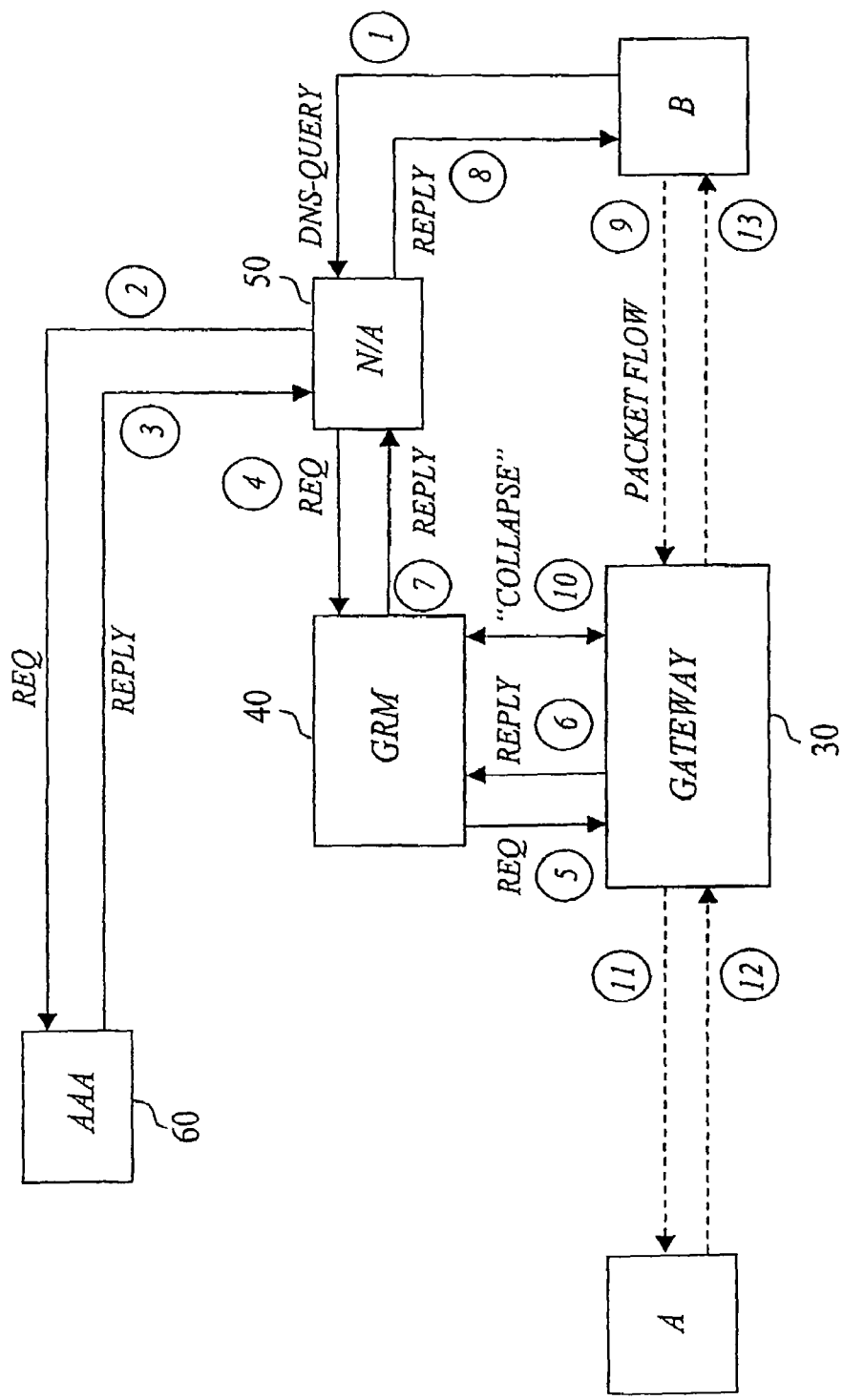
FIG. 9 is a schematic diagram illustrating an example of an overall system for enabling support for flexible and efficient outside-realm initiated connections according to a preferred embodiment of the invention.

For a better understanding of the complex mechanisms involved in the invention, it is useful to begin with an exemplary overall system overview, referring to FIG. 9.

FIG. 9 is a schematic diagram illustrating an example of an overall system for enabling support for flexible and efficient outside-realm initiated connections according to a preferred embodiment of the invention. The exemplary overall system for interconnecting an inside node A and an outside node B comprises an intermediate gateway 30, an associated gateway resource manager 40, a name-to-address (N/A) translator 50 or equivalent translator together with an associated AAA-server 60. The N/A-translator 50 may for example be a modified DNS server, which accepts a query including a name, and finally responds with a reply including a network address belonging to the outside realm. Optionally, the query and reply also include port number information. A name is a globally unique string that is associated to each node. For example, the name of a communication node could be a FQDN (Fully Qualified Domain Name) formed as a mobile telephone number, MSISDN, together with the operator's domain name, e.g. "070123456789.operator.country". The AAA-server 60 includes functionality for managing dynamic profile data, including name information and inside-realm related network address information, for the communication nodes currently within the inside realm. More generally, the N/A-translator 50 is an identifier-to-address translator, accepting a general identifier query including a DNS-query, a SIP-URI-query [6] and similar query of any proprietary protocol.

In an exemplary basic scenario, a client application is started in an inside node A such as a mobile terminal or other node equipment. The client application opens a socket, i.e. a (low-level) networking interface, and starts listening on a port. Assume by way of example that the client has a private IPv4 address behind the gateway 30, and that outside the gateway towards the outside node B, e.g. an application server of a service provider or other node equipment, normal public routing takes place. It is furthermore assumed that the mobile terminal or other equipment of node A has a name, or similar identifier, and that it has registered itself in the private inside realm so that the AAA-server 60 includes a profile with the name together with the private network address or equivalent symbol identifying a point-to-point interface. The application server of node B may know in advance what port number (a so-called well known or pre-defined port) the client software is listening to, or alternatively the client software may signal the port number to the public application server in a registration message. Node B normally also has knowledge of the name of node A.

In the example of FIG. 9, control signaling interfaces are indicated by solid lines and packet data interfaces are indicated by dashed lines.

At first, the node B application server sends a DNS-query (1) or equivalent query to the N/A-translator 50. The query also includes information on the public network address of node B and/or information about which port node A is listening to. The N/A-translator 50 sends a request (2) including the name of node A to the AAA-server 60, which responds with a reply (3) including the private network address of node A, or equivalently a symbol representing a point-to-point interface to node A. The N/A-translator 50 then sends an allocation request (4) including the name and associated private network address representation of node A together with the public network address of node B and/or the inside node port number to the gateway resource manager (GRM) 40. Based on this information, the gateway resource manager 40 identifies a suitable public gateway address for node A and sends a request (5) to the gateway (GW) 30 for creating a gateway connection state. After creating the gateway connection state, the gateway 30 sends a reply (6) confirming the state set-up to the resource manager 40. The resource manager 40 then sends a reply (7) including the public gateway address allocated to node A towards the N/A-translator 50, which in turn forwards this information in a final reply (8) to node B. The application server of node B now sends (9) the first packet to the gateway 30, which if necessary picks up complementary connection information such as the port number used by node B and perhaps also the address of node B for enabling the gateway 30 to transform a possibly incomplete gateway connection state into a complete gateway state. Upon collapsing an incomplete gateway connection state, the gateway 30 preferably informs (10) the resource manager 40, which in turn updates its list representation of gateway connection states. In the gateway 30, the inside-bound process cooperates with the packet forwarding process to deliver the packet through the gateway 30 and onwards (11) to node A. Node A can reply (12) and send information through the gateway 30 and onwards (13) to node B.

It is also possible to provide the DNS-query directly to the gateway resource manager, which in turn forwards the name information to an associated name-to-address translator function that returns an inside network address related to the relevant inside node. As before, the gateway resource manager assigns a public gateway address to the inside node based on predetermined connection information included in the DNS-query and sends a DNS-reply including the assigned address to the requesting outside node.

From an implementational point of view the overall central addressing mechanism, including the name-to-address translator and the gateway resource manager, can be realized in a single process, in different processes running on a single node, or in different processes that are physically separated in several nodes.

If the outside node network address is used for identifying a suitable gateway address, it is recommended that the name query is delivered directly and not relayed by intermediate nodes. In the case when a DNS server is used for name look-up, this corresponds to disabling so-called recursive look-ups by setting the RD (Recursive Desired) bit to "0", and instead rely on iterative look-ups. Uncontrolled caching should also be avoided by setting the TTL (Time-To-Live) parameter to a value smaller than the time distance between two consecutive flow initiations towards the same inside-realm node and port number.

As previously indicated, it may not be necessary to perform the state set-up in two phases. Instead, it is actually possible to establish a complete gateway connection state directly based on the available connection information including the outside node address and/or the inside node port, eliminating the need for the signaling indicated at (10). This obviously reduces the multiplexation gain somewhat since the outside node port number can not be used as a distinguishing parameter when setting up the gateway connection state. Such a solution may however be sufficient depending on the circumstances.

General mechanisms for controlling NAT/FW states have been proposed by the Internet Engineering Task Force working group on Middlebox Communication (MIDCOM).

Sequence Diagrams for Outside-Realm Initiated Communication

Substitution Style—Source Address Known

Figure 10:
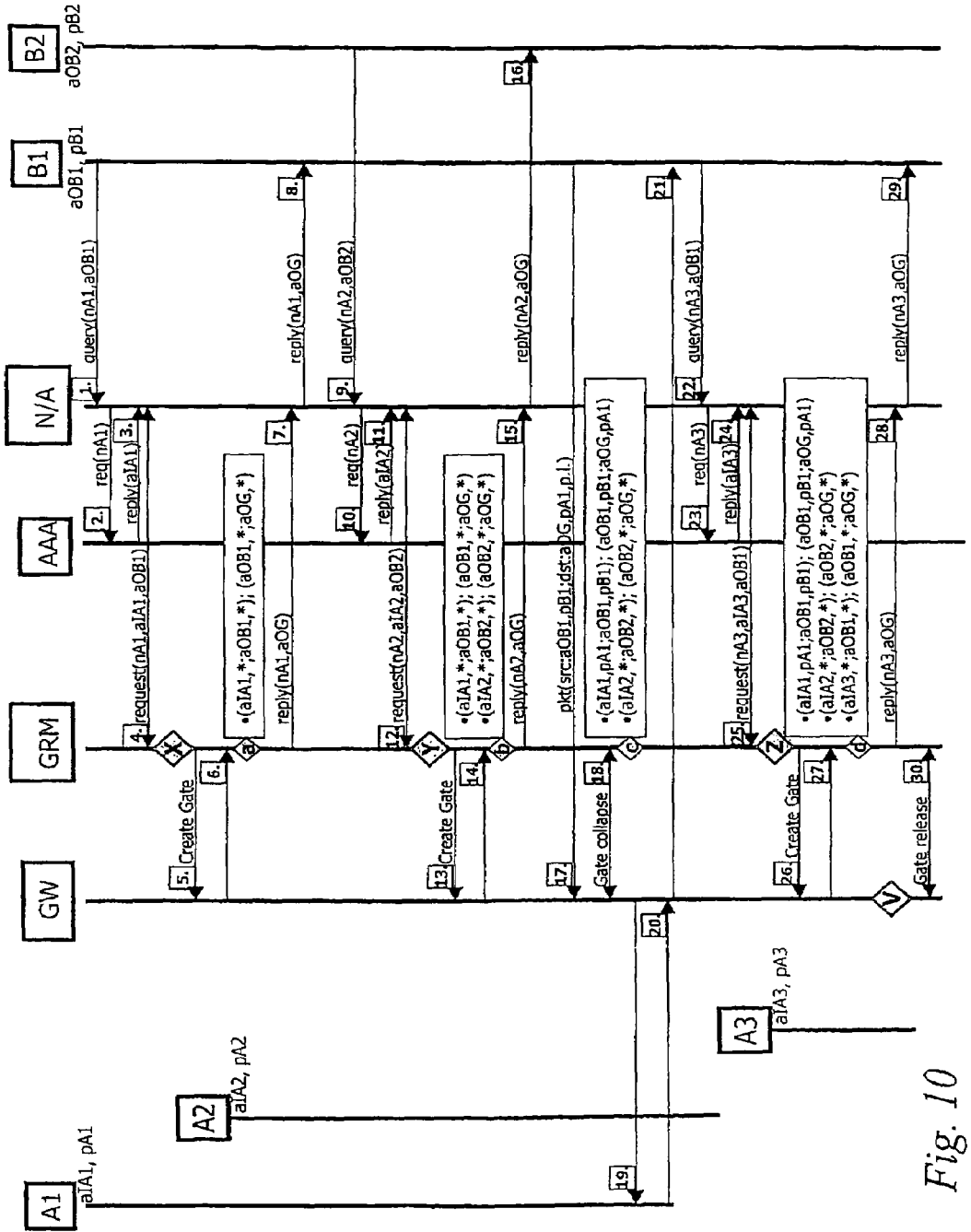
FIG. 10 is a schematic sequence diagram illustrating the relevant signaling between the involved elements for an illustrative example of outside-realm initiated communication through a substitution style gateway, using outside node address information for efficient multiplexation.

FIG. 10 is a schematic sequence diagram illustrating the relevant signaling between the involved elements for an illustrative example of outside-realm initiated communication through a substitution style gateway, using outside node (source) address information for efficient multiplexation.

In this example, the initial state is that a communication node A in the inside realm has started an application that is listening for incoming traffic on port number pA. Node A has the "name" nA. Node A has registered itself in the inside realm so that the AAA-server has a profile that includes nA together with the network address (aIA) that is allocated to node A. A communication node B in the outside realm wishes to establish communication towards node A. Node B has knowledge of nA and pA.

In the following sequence, there are three inside nodes with names nA1, nA2, and nA3, inside-realm addresses aIA1, aIA2, and aIA3, listening to ports pA1, pA2, and pA3, respectively. Also, there are two outside nodes with outside-realm addresses aOB1 and aOB2, sending on ports pB1 and pB2, respectively.

1. Node B1 sends a query including nA1 to the N/A-translator. The address aOB1 is visible in the source field of the query packet.
2. The N/A sends a request including nA1 to the AAA-server.
3. The AAA-server looks up the network address, aIA1, corresponding to nA1 and sends a reply to the N/A including nA1 and aIA1.
4. The N/A sends a request including nA1, aIA1, and aOB1 to the gateway resource manager (GRM).
    In Process X, the gateway resource manager performs the following algorithm: In this case, it is assumed that there are no existing partial gateway states, also referred to as gates. The gateway resource manager can therefore freely select aOG from the gateway address list, usually taking the first available address.
5. The gateway resource manager sends a request to the gateway to create the partial gateway state (gate) described in box a.
6. The gateway replies after creating the partial gateway state.
7. The gateway resource manager sends a response including nA1 and aOG.
8. The N/A sends a response including nA1, aOG to node B1.
9. Node B2 sends a query including nA2 and aOB2 to the N/A. The address aOB2 is visible in the source field of the query packet.
10. The N/A sends a request including nA2 to the AAA-server.
11. The AAA-server looks up the network address, aIA2, corresponding to nA2 and sends a reply including nA2 and aIA2 to the N/A.
12. The N/A sends a request including nA2, aIA2, and aOB2 to the gateway resource manager.
    In Process Y, the gateway resource manager performs the following algorithm: Try to select aOG from the gateway address list so that the outside n-tuple (partly unspecified)(src:(aOB2,*); dest:(aOG,*); ... ) is not an outside n-tuple of an already existing partial gateway state. In this case, since aOB2 is not equal to aOB1, it's OK to select any aOG, even the same aOG as was selected in Process X above. If that would not have been the case, another aOG than that selected in Process X had had to be chosen.
13. The resource manager sends a request to the gateway to create the gateway state described on the second row in box b.
14. The gateway replies after creating the partial gateway state.
15. The resource manager sends a response including nA2 and aOG.
16. The N/A sends a response including nA2 and aOG to node B2.
17. Node B1 sends the first packet in the communication flow towards node A1.
18. In the gateway, the partial gateway state collapses into a complete gateway state, whereby the outside n-tuple is completed so that it is: (src:(aOB1, pB1); dest:(aOG, pA1); ... ) and the inside n-tuple is (src:(aIA1, pA1); dest:(aOB1, pB1); ... ), as seen in box c.
19. The packet is forwarded by the gateway towards node A1.
20. Node A1 sends the next packet in the communication flow towards node B1.
21. The packet is forwarded by the gateway towards node B1.
22. Node B1 sends a query including nA3 to the N/A. The address aOB1 is visible in the source field of the query packet.
23. The N/A sends a request including nA3 to the AAA-server.
24. The AAA-server looks up the network address, aIA3, corresponding to nA3 and sends a reply including nA3 and aIA3 to the N/A.
25. The N/A sends a request including nA3, aIA3, and aOB1 to the resource manager.
    In Process Z, the resource manager performs the following algorithm: Try to select aOG from the gateway address list, so that the outside n-tuple (partly unspecified)(src:(aOB1,*); dest:(aOG,*); ... ) is not an outside n-tuple of an already existing partial gateway state. It's OK that the complete gateway state in the first row in box c already exists. This is because we can safely assume that node B1 will use a port number different from pB1 when sending traffic towards node A3.
26. The resource manager sends a request to the gateway to create the partial gateway state described on the third row in box d.
27. The gateway replies after creating the gateway state.
28. The resource manager sends a response including nA3, aOG.
29. The N/A sends a response including nA3, aOG to node B1.
    In process V, the gateway preferably starts a timer after creating a partial gateway state. When the timer reaches a certain value, gate lifetime, and the partial gateway state has not yet collapsed, the partial gateway state is deleted, releasing the gate.
30. The gateway informs the resource manager that the partial gateway state has been deleted. The resource manager updates its list of existing partial gateway states accordingly.

As mentioned above, in practical cases, it may happen that the reply in steps 8, 16, and 29 is cached. However, for this solution to work satisfactory, the cached data must be deemed invalid after a time interval which is smaller than the time distance between two consecutive flow initiations towards the same inside-realm node and port number.

Substitution Style—Destination Port Known

Figure 11:
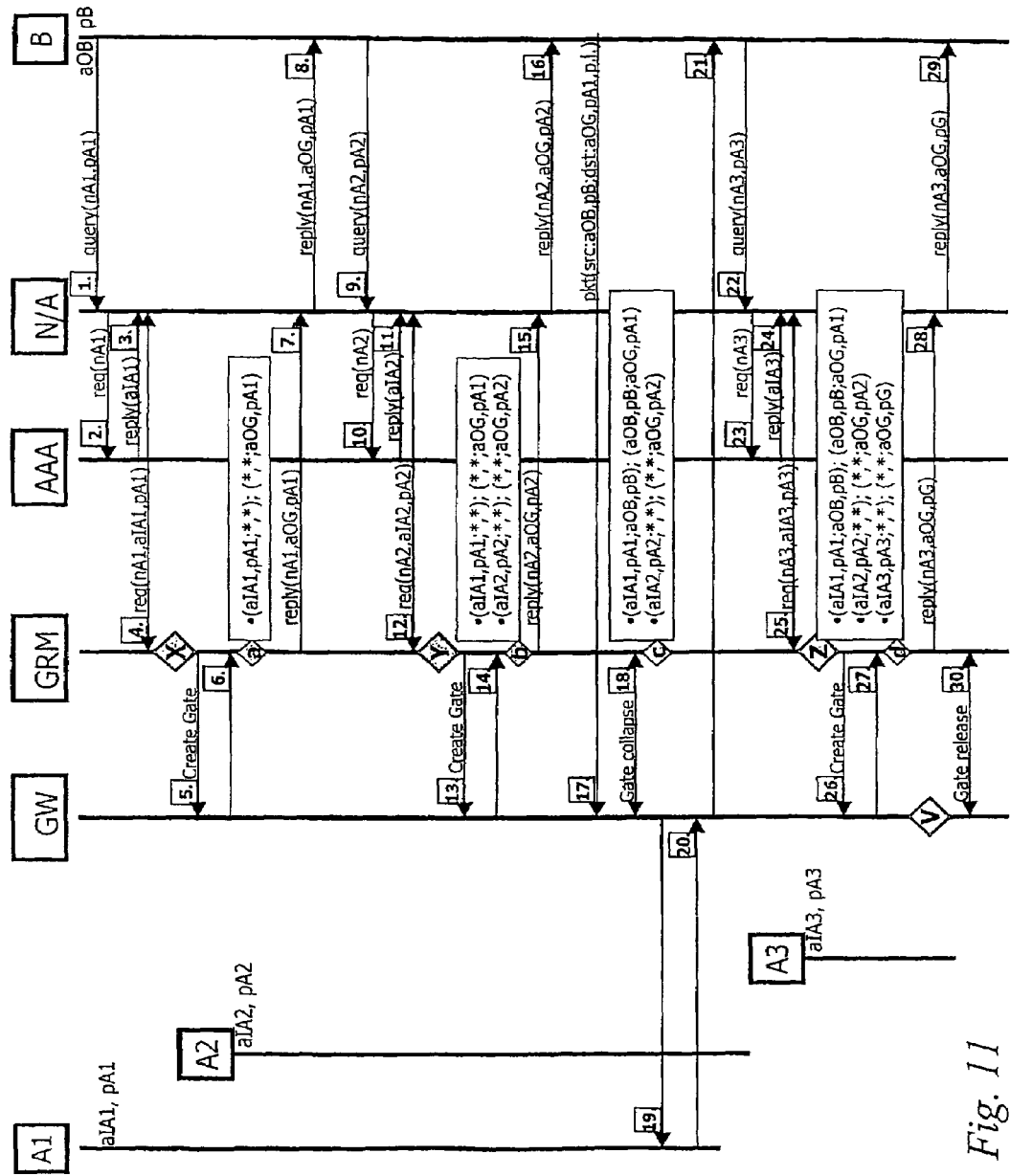
FIG. 11 is a schematic sequence diagram illustrating the relevant signaling between the involved elements for an illustrative example of outside-realm initiated communication through a substitution style gateway, using inside node port information for efficient multiplexation.

FIG. 11 is a schematic sequence diagram illustrating the relevant signaling between the involved elements for an illustrative example of outside-realm initiated communication through a substitution style gateway, using inside node (destination) port information for efficient multiplexation.

This applies when the port number pA that Node A is listening on becomes known to the N/A-translator in the name query. For example, the DNS query may have the form: "_port._protocol._MSISDN.operator.country". A specific example would be "_4712._tcp.070123456789.telia.se". Alternatively, the DNS query could have the form: "_service._protocol._MSISDN.operator.country". A specific example in this case would be "_http._tcp.0733634026.telia.se". The string "http" would then be translated into a port number, in this case 80.

In the following example, the initial state is that a communication node A in the inside realm has started an application that is listening for incoming traffic on port number pA. Node A has the name nA. Node A has registered itself in the inside realm so that the AAA-server has a profile which includes nA together with the network address aIA that is allocated to node A. A communication node B in the outside realm wishes to establish communication towards node A. Node B has knowledge of nA and pA.

In the following sequence, there are three inside nodes with names nA1, nA2, and nA3, inside-realm addresses aIA1, aIA2, and aIA3, listening to ports pA1, pA2, and pA3, respectively.

1. Node B sends a query including nA1 and pA1 to the N/A.
2. The N/A sends a request including nA1 to the AAA-server.
3. The AAA-server looks up the network address, aIA1, corresponding to nA1 and sends a reply including nA1 and aIA1 to the N/A.
4. The N/A sends a request including nA1, aIA1, and pA1 to the gateway resource manager (GRM).
   In Process X, the resource manager performs the following algorithm: In this case it is assumed that there are no existing partial gateway states, also referred to as gates. The resource manager can therefore freely select aOG from the gateway address list.
5. The resource manager sends a request to the gateway to create the gateway state described in box a.
6. The gateway replies after creating the partial gateway state (gate).
7. The resource manager sends a response including aOG and pA1.
8. The N/A sends a response to node B including nA1, aOG, and pA1.
9. Node B sends a query including nA2 and pA2 to N/A.
10. The N/A sends a request including nA2 to the AAA-server.
11. The AAA-server looks up the network address, aIA2, corresponding to nA2 and sends a reply including nA2 and aIA2 to N/A.
12. The N/A sends a request including nA2, aIA2, and pA2 to the resource manager.
    In Process Y, the resource manager performs the following algorithm: Try to select aOG from the gateway address list so that the outside n-tuple (partly unspecified)(src: (*,*); dest:(aOG, pA2); . . . ) is not an outside n-tuple of an already existing partial gateway state. Assume in this example, that pA2 is not equal pA1. This means that it's OK to select the same aOG as was selected in process X above. If pA2 is equal to pA1, the resource manager should try to select an address from the gateway address list different from aOG.
13. The resource manager sends a request to the gateway to create the gateway state described on the second row in box b.
14. The gateway replies after creating the partial gateway state.
15. The resource manager sends a response including nA2, aOG, and pA2.
16. The N/A sends a response including nA2, aOG, and pA2 to node B.
17. Node B sends the first packet in the communication flow towards node A1.
18. In the gateway, the partial gateway state collapses into a complete gateway state, whereby the outside n-tuple is completed so that it is: (src:(aOB, pB); dest:(aOG, pA1); . . . ) and the inside n-tuple is (src:(aIA1, pA1); dest:(aOB, pB); . . . ), as seen in box c.
19. The packet is forwarded by the gateway towards node A1.
20. Node A1 sends the next packet in the communication flow towards node B.
21. The packet is forwarded by the gateway towards node B.
22. Node B sends a query including nA3 and pA3 to N/A.
23. The N/A sends a request including nA3 to the AAA-server.
24. The AAA-server looks up the network address, aIA3, corresponding to nA3 and sends a reply including nA3 and aIA3 to N/A.
25. The N/A sends a request including nA3, aIA3, and pA3 to the resource manager.
    In Process Z, the resource manager performs the following algorithm: Try to select aOG from the gateway address list so that the outside n-tuple (partly unspecified)(src: (*,*); dest:(aOG, pA3); . . . ) is not an outside n-tuple of an already existing partial gateway state. It's OK that the complete gateway state in the first row in box c already exists. This is because we can safely assume that node B will use a port number different from pB when sending traffic towards node A3. If all addresses in the gateway address list are contained in existing partial gateway states together with the port number pA3, then the resource manager should select a new port number pG so that the outside n-tuple (partly unspecified)(src:(*,*); dest:(aOG, pG); . . . ) is not an outside n-tuple of an already existing partial gateway state.
26. The gateway resource manager sends a request to the gateway to create the gateway state described on the third row in box d.
27. The gateway replies after creating the partial gateway state.
28. The resource manager sends a response including nA3, aOG, and pG.
29. The N/A sends a response including nA3, aOG, and pG to node B.
    In process V, the gateway starts a timer after creating a partial gateway state. When the timer reaches a certain value, and the partial state has not yet collapsed, the partial state is deleted.
30. The gateway informs the resource manager that the partial state has been deleted, and the resource manager updates its lists of existing partial gateway states accordingly.

As indicated in the sequence above, there are two cases. In the replies (steps 8, 16, and 29) from the N/A-translator, either the port number is equal to the port number sent in the respective queries (Steps 1, 9, and 22) or not. The former case is the desired since the application in node B is expecting to send towards port number pA. It is recommended that the latter case is used only as a fallback case since it may require implementation changes in the application in node B.

As before, cached data associated with replies back to an outside node must be handled with care.

Relaying Style—Source Address Known

Figure 12:
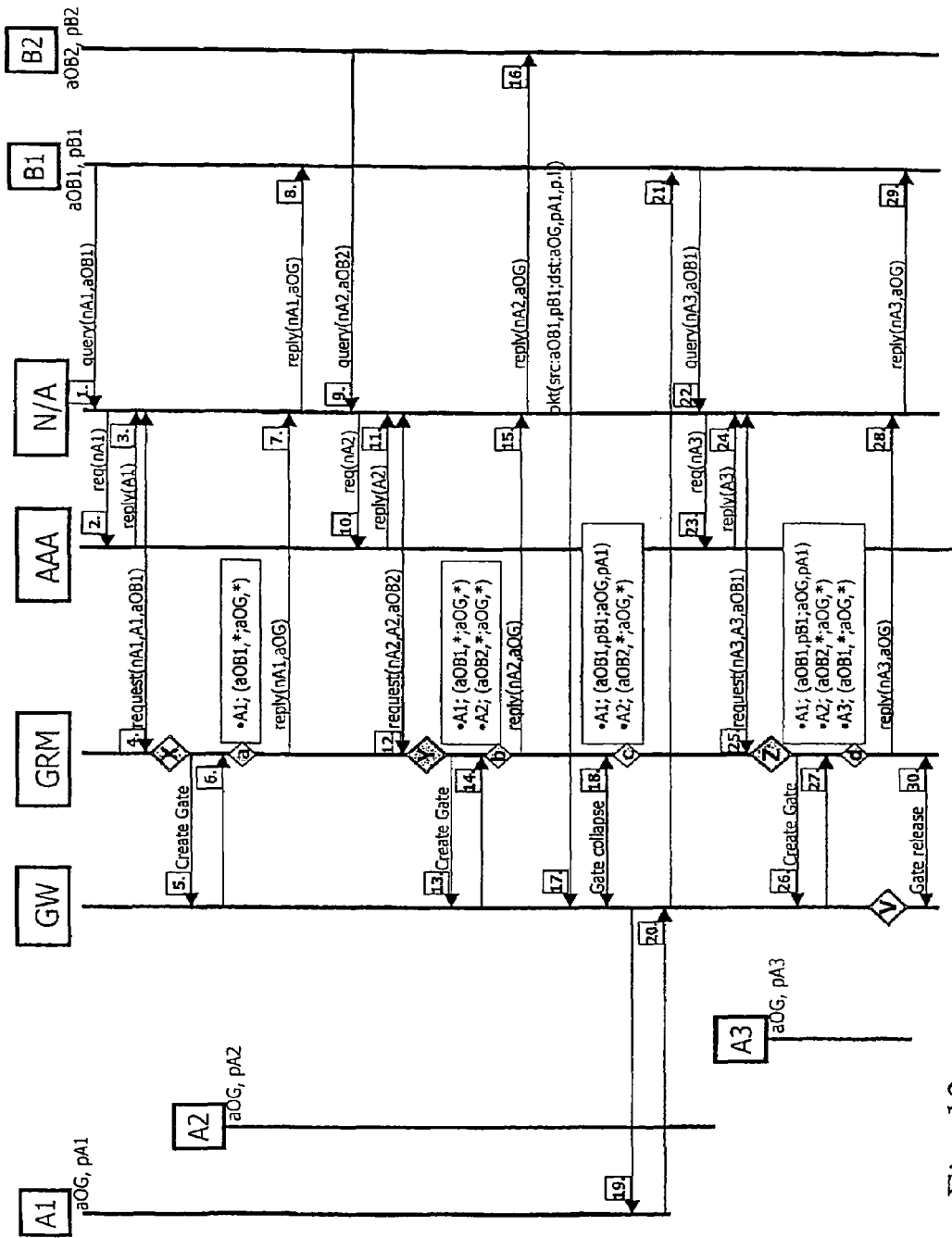
FIG. 12 is a schematic sequence diagram illustrating the relevant signaling between the involved elements for an illustrative example of outside-realm initiated communication through a relaying style gateway, using outside node address information for efficient multiplexation.

FIG. 12 is a schematic sequence diagram illustrating the relevant signaling between the involved elements for an illustrative example of outside-realm initiated communication through a relaying style gateway, using outside node (source) address information for efficient multiplexation.

This solution applies when the network address of node B becomes known to the N/A-translator in the name query. This is the case if the name queries are delivered directly and not relayed by intermediate nodes. In the case when DNS is used for name look-up, this corresponds to disabling recursive look-ups, instead relying on iterative look-ups.

As previously mentioned, in the relaying case, the inside-realm node is aware of the outside-realm network address it has been allocated. Thus, application software running on an inside-realm node expecting a communication flow initiated from the outside realm must bind to the currently assigned outside-realm network address. We can therefore assume that all inside nodes have been allocated outside-realm addresses. Since we must generally support more nodes than the number of outside-realm addresses that are available to the gateway, we must assume that some inside nodes are allocated the same outside-realm address. In the following sequence we show three inside nodes A1, A2, and A3, all having the same outside-realm address aOG. We furthermore assume that the gateway resource manager keeps track of which outside-realm address is allocated to a particular inside node based on some index represented in the sequence messages by the symbols "A1", "A2", and "A3". When the virtual point-to-point link toward an inside node is implemented as an IP-in-IP tunnel, an example would be that the symbol "A1" is the inside-realm address aIA1 allocated to the node A1.

1. Node B1 sends a query including nA1 to the N/A-translator. The address aOB1 is visible in the source field of the query packet.
2. The N/A-translator sends a request including nA1 to the AAA-server.
3. The AAA-server looks-up the symbol, A1, corresponding to nA1 and sends a reply including nA1 and A1 to the N/A.
4. The N/A sends a request including nA1, A1, and aOB1 to the gateway resource manager (GRM).
   In Process X, the gateway resource manager performs the following algorithm: In this case it is assumed that there are no existing partial gateway states, also referred to as gates. Based on the symbol A1, the resource manager finds aOG, the outside-realm address currently allocated to node A1.
5. The gateway resource manager sends a request to the gateway to create the gateway state described in box a.
6. The gateway replies after creating the gateway state.
7. The resource manager sends a response including nA1 and aOG.
8. The N/A sends a response including nA1 and aOG to node B1.
9. Node B2 sends a query including nA2 to N/A. The address aOB2 is visible in the source field of the query packet.
10. The N/A sends a request including nA2 to the AAA-server.
11. The AAA-server looks-up the symbol, A2, corresponding to nA2 and sends a reply including nA2 and A2 to the N/A.
12. The N/A sends a request including nA2, A2, and aOB2 to the gateway resource manager.
    In Process Y, the resource manager performs the following algorithm: Based on the symbol A2, the resource manager finds aOG, the outside-realm address currently allocated to node A2. If the outside n-tuple (partly unspecified) (src:(aOB2, *); dest:(aOG, *); ...) is not an outside n-tuple of an already existing partial gateway state, then it's OK to create a new partial gateway state with that outside n-tuple. In this case, since aOB2 is not equal to aOB1, it's OK to create a new partial gateway state (gate), with the outside n-tuple (partly unspecified) (src:(aOB2, *); dest:(aOG, *); ...).
13. The gateway resource manager sends a request to the gateway to create the gateway state described on the second row in box b.
14. The gateway replies after creating the partial gateway state.
15. The gateway resource manager sends a response including nA2 and aOG.
16. The N/A sends a response including nA2 and aOG to node B2.
17. Node B1 sends the first packet in the communication flow towards node A1.
18. In the gateway, the partial gateway state collapses into a complete gateway state, whereby the outside n-tuple is completed so that it is: (src:(aOB1, pB); dest:(aOG, pA1); ...), as seen in box c.
19. The packet is forwarded by the gateway towards node A1 (relaying style).
20. Node A1 sends the next packet in the communication flow towards node B1.
21. The packet is forwarded by the gateway towards node B1 (relaying style).
22. Node B1 sends a query including nA3 to the N/A. The address aOB1 is visible in the source field of the query packet.
23. The N/A sends a request including nA3 to the AAA-server.
24. The AAA-server looks up the symbol, A3, corresponding to nA3 and sends a reply including nA3 and A3 to the N/A.
25. The N/A sends a request including nA3, A3, and aOB1 to the gateway resource manager.
    In Process Z, the resource manager performs the following algorithm: Based on the symbol A3, the resource manager finds aOG, the outside-realm address currently allocated to node A3. If the outside n-tuple (partly unspecified) (src:(aOB1, *); dest:(aOG, *); ...) is not an outside n-tuple of an already existing partial gateway state (gate), then it's OK to create a new partial gateway state with that outside n-tuple. It's OK that the complete gateway state in the first row in box c already exists. This is because we can safely assume that node B1 will use a port number different from pB1 when sending traffic towards node A3. In case a partial gateway state with the outside n-tuple (partly unspecified)(src:(aOB1, *); dest:(aOG, *); ...) already exists, then there is not enough information available to distinguish the soon incoming communication flows. Preferably, the resource manager should therefore instruct the N/A to either not respond at all towards node B2 or respond with an explicit error message. This error case is not shown in the sequence.
26. The gateway resource manager sends a request to the gateway to create the partial gateway state (gate) described on the third row in box d.
27. The gateway replies after creating the partial gateway state.
28. The resource manager sends a response including nA3 and aOG.
29. The N/A sends a response including nA3 and aOG to node B1.
    In process V, the gateway starts a timer after creating a partial gateway state. When the timer reaches a certain value, and the partial state has not yet collapsed, the state is deleted.
30. The gateway informs the gateway resource manager that the partial gateway state has been deleted, and the resource manager updates its lists of existing partial gateway states accordingly.

As before, cached data associated with replies back to an outside node must be handled with care.

Relaying Style—Destination Port Known

Figure 13:
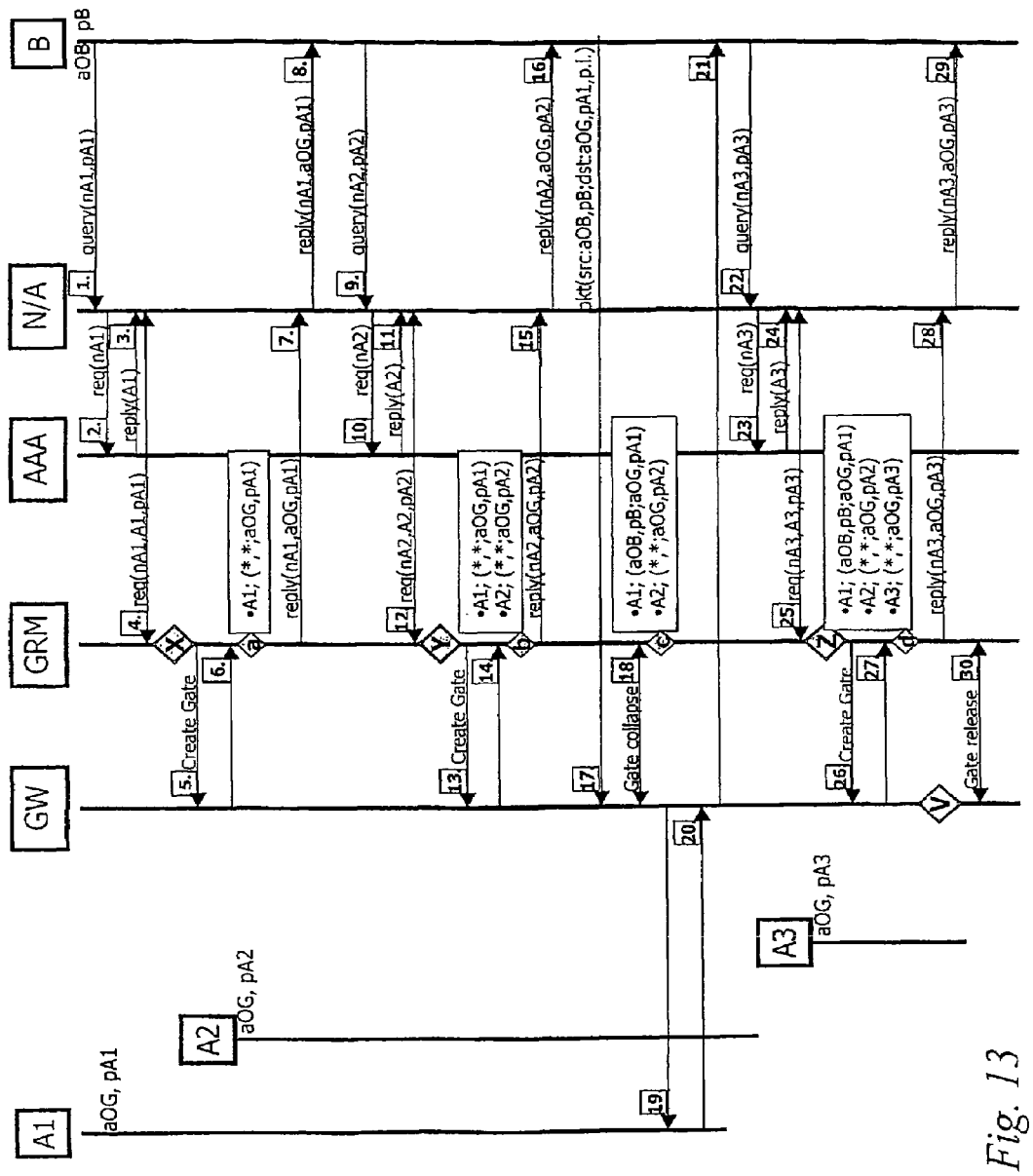
FIG. 13 is a schematic sequence diagram illustrating the relevant signaling between the involved elements for an illustrative example of outside-realm initiated communication through a relaying style gateway, using inside node port information for efficient multiplexation.

FIG. 13 is a schematic sequence diagram illustrating the relevant signaling between the involved elements for an illustrative example of outside-realm initiated communication through a relaying style gateway, using inside node (destination) port information for efficient multiplexation.

This applies when the port number pA that Node A is listening on becomes known to the N/A-translator in the name query.

In the following sequence we show three inside nodes A1, A2, and A3, all having the same outside-realm address aOG. Also, it is assumed that the gateway resource manager keeps track of which outside-realm address that is allocated to a particular inside node based on some index, represented in the sequence messages by the symbols "A1", "A2", and "A3".

1. Node B sends a query including nA1 and pA1 to the N/A.
2. The N/A sends a request including nA1 to the AAA-server.
3. The AAA-server looks-up the symbol, A1, corresponding to nA1 and sends a reply including nA1 and A1 to the N/A.
4. The N/A sends a request including nA1, A1, and pA1 to the gateway resource manager.
    In Process X, the resource manager performs the following algorithm: In this case it is assumed that there are no existing partial gateway states, also referred to as gates. Based on the symbol A1, the resource manager finds aOG, the outside-realm address currently allocated to node A1.
5. The gateway resource manager sends request to the gateway to create the gateway state described in box a.
6. The gateway replies after creating the partial gateway state.
7. The resource manager sends a response including nA1, aOG, and pA1.
8. The N/A sends a response including nA1, aOG, and pA1 to node B.
9. Node B sends a query including nA2 and pA2 to the N/A.
10. The N/A sends a request including nA2 to the AAA-server.
11. The AAA-server looks up the symbol, A2, corresponding to nA2 and sends a reply including nA2 and A2 to the N/A.
12. The N/A sends a request including nA2, A2, and pA2 to the gateway resource manager.
    In Process Y, the gateway resource manager performs the following algorithm:
    Based on the symbol A2, the resource manager finds aOG, the outside-realm address currently allocated to node A2. If the outside n-tuple (partly unspecified)(src:(*,*); dest:(aOG, pA2); ... ) is not an outside n-tuple of an already existing partial gateway state (gate), then it's OK to create a new partial gateway state with that outside n-tuple. In this case, this means that if pA2 is not equal pA1, then it's OK to create a new partial gateway state with the outside n-tuple (partly unspecified)(src:(*,*); dest:(aOG, pA2); ... ). On the other hand, if pA2 is equal to pA1 there is not enough information available to distinguish the soon incoming communication flows. The resource manager should therefore preferably instruct the N/A-translator to either not respond at all towards node B or respond with an explicit error message. This error case is not shown in the sequence.
13. The gateway resource manager sends a request to the gateway to create the gateway state described on the second row in box b.
14. The gateway replies after creating the partial gateway state (gate).
15. The resource manager sends a response including nA2, aOG, and pA2.
16. The N/A sends a response including nA2, aOG, and pA2 to node B.
17. Node B sends the first packet in the communication flow towards node A1.
18. In the gateway, the partial gateway state collapses into a complete gateway state, whereby the outside n-tuple is completed so that it is: (src:(aOB, pB); dest:(aOG, pA1); ... ), as seen in box c.
19. The packet is forwarded by the gateway towards node A1 (relaying style).
20. Node A1 sends the next packet in the communication flow towards node B.
21. The packet is forwarded by the gateway towards node B (relaying style).
22. Node B sends a query including nA3 and pA3 to the N/A.
23. The N/A sends a request including nA3 to the AAA-server.
24. The AAA-server looks-up the symbol, A3, corresponding to nA3 and sends a reply including nA3 and A3 to the N/A.
25. The N/A sends a request including nA3, A3, and pA3 to the resource manager.
    In Process Z, the resource manager performs the following algorithm: Based on the symbol A3, the resource manager finds aOG, the outside-realm address currently allocated to node A3. If the outside n-tuple (partly unspecified) (src:(*,*); dest:(aOG, pA3); ... ) is not an outside n-tuple of an already existing partial gateway state (gate), then it's OK to create a new partial gateway state with that outside n-tuple. If this is not possible we have the same error case as in Process Y above. It's OK that the complete gateway state in the first row in box c already exists. This is because we can safely assume that node B will use a port number different from pB when sending traffic towards node A3.
26. The gateway resource manager sends request to the gateway to create the gateway state described on the third row of box d.
27. The gateway replies after creating the partial gateway state.
28. The gateway resource manager sends a response including nA3, aOG, and pG.
29. The N/A sends a response including nA3, aOG, and pG to node B.
    In process V, the gateway starts a timer after creating a partial gateway state. When the timer reaches a certain value, and the gate has not yet collapsed, the gate is deleted.
30. The gateway informs the resource manager that the gate has been deleted, and the resource manager updates its lists of existing gates accordingly.

Implementation Examples

Figure 14:
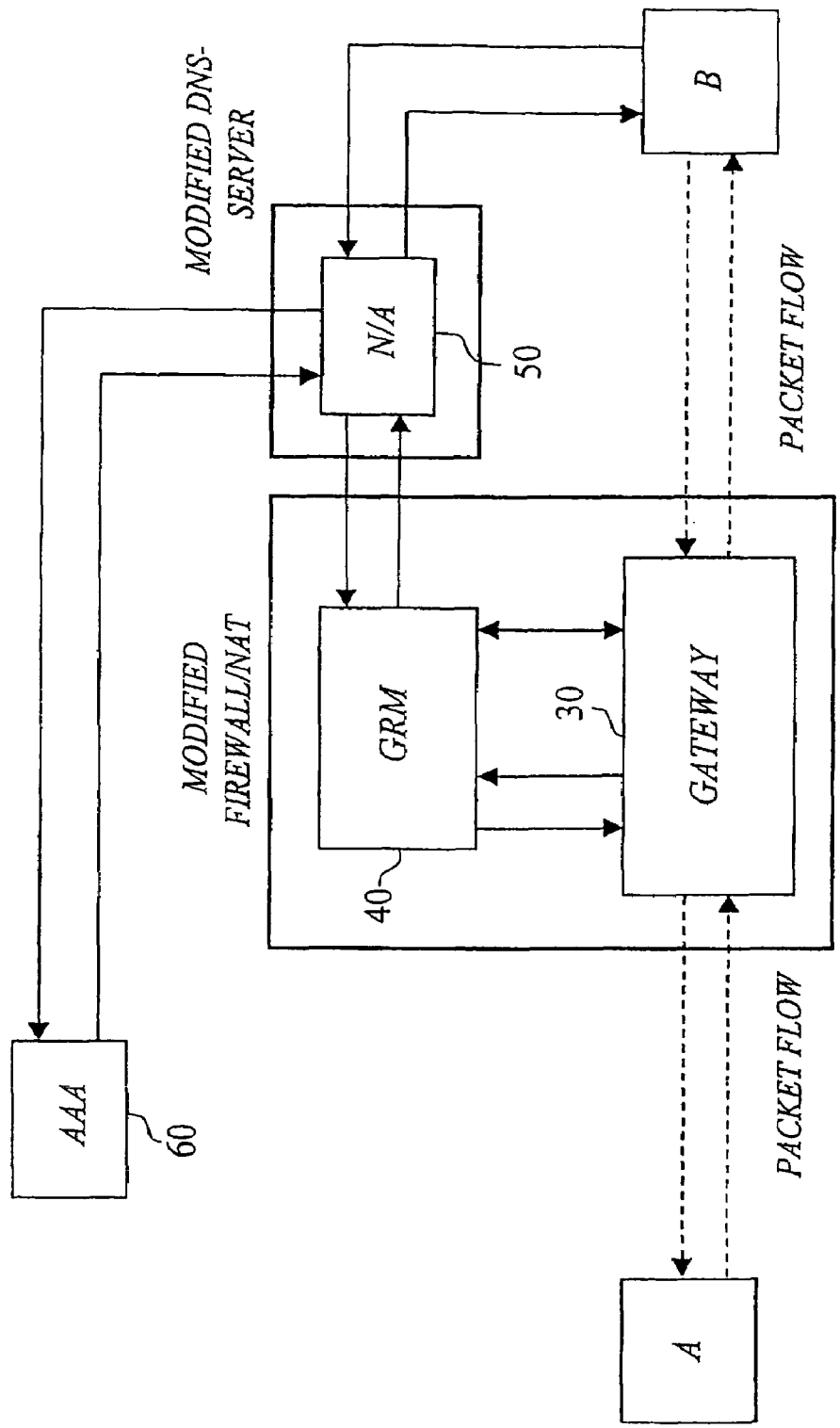
FIG. 14 is a schematic block diagram illustrating an implementation example of a system for providing connectivity between nodes of different address realms according to a particular embodiment of the invention.

FIG. 14 is a schematic block diagram illustrating an implementation example of a system for providing connectivity between nodes of different address realms according to a particular embodiment of the invention. The implementation of FIG. 14 generally corresponds to the overall system overview of FIG. 9, but with the gateway 30 and gateway resource manager 40 implemented in a modified firewall/network address translator (FW/NAT) node, and the N/A-translator implemented in a modified DNS-server. This means that the gateway resource manager 40 is co-located with the gateway 30, and perhaps even integrated in the gateway.

Figure 15:
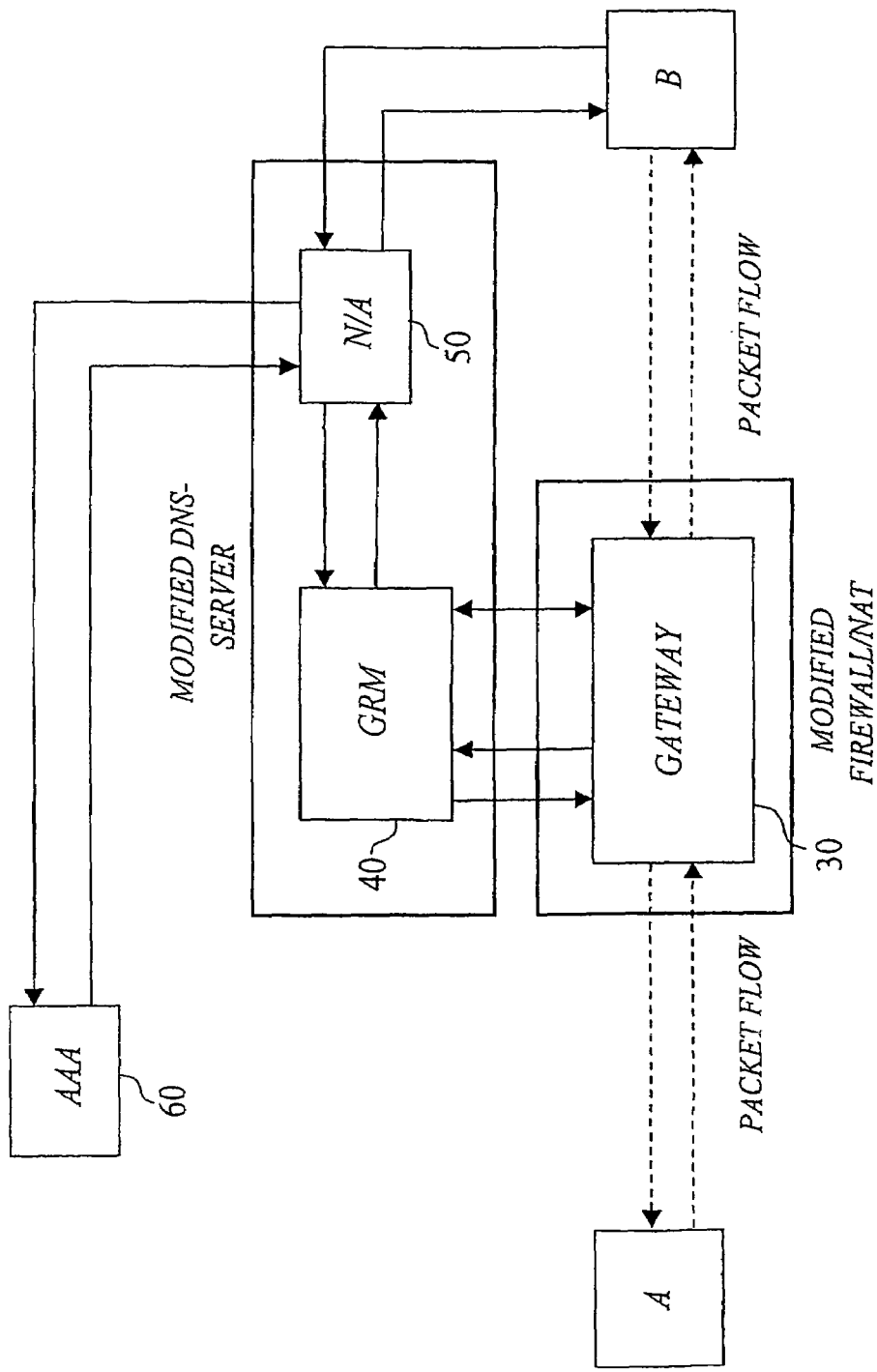
FIG. 15 is a schematic block diagram illustrating an implementation example of a system for providing connectivity between nodes of different address realms according to another particular embodiment of the invention.

FIG. 15 is a schematic block diagram illustrating an implementation example of a system for providing connectivity between nodes of different address realms according to another particular embodiment of the invention. In this example, the gateway resource manager 40 and the N/A-translator 50 are implemented in a modified DNS-server, whereas the gateway 30 is implemented in a modified FW/NAT node.

In yet another implementation, the gateway resource manager 40 is implemented in a separate network node.

The embodiments described above are merely given as examples, and it should be understood that the present invention is not limited thereto. Further modifications, changes and improvements which retain the basic underlying principles disclosed and claimed herein are within the scope of the invention.

REFERENCES

[1] *IP Network Address Translator (NAT) Terminology and Considerations*, P. Srisuresh, M. Holdrege, RFC 2663 of the Internet Engineering Task Force, August 1999.
[2] *Realm Specific IP: Framework*, M. Borella, J. Lo, D. Grabelsky, G. Montenegro, RFC 3102 of the Internet Engineering Task Force, October 2001.
[3] *Realm Specific IP: Protocol Specification*, M. Borella, D. Grabelsky, J. Lo, K. Taniguchi, RFC 3103 of the Internet Engineering Task Force, October 2001.
[4] htttp://www.permeo.com/pdf/solutionpaper1.pdf, 2002.
[5] *Address Allocation for Private Internets*, Y. Rekhter, B. Moskowitz, D. Karrenberg, G. J. de Groot, E. Lear, RFC 1918 of the Internet Engineering Task Force, February 1996.
[6] *SIP: Session Initiation Protocol*, M. Handley, H. Schuilzrinne, E. Schooler, J. Rosenberg, RFC 2543 of the Internet Engineering Task Force, March 1999 2001.

The invention claimed is:

1. A method for supporting establishment of a requested connection between a node of an inside address realm and a node of an outside address realm through an intermediate communication gateway having a gateway address pool comprising a limited number of available outside-realm gateway addresses for enabling outside-realm representation of inside-realm nodes, said method comprising the steps of:
  i) providing multiplexing information including at least one of network address information and port information of at least one of said inside-realm node and said outside-realm node;
  ii) performing, prior to initiating establishment of said requested connection, a network address allocation procedure to determine an outside-realm gateway address based on a unique combination of one of said limited number of outside-realm gateway addresses and said multiplexing information, said network address allocation procedure including the steps of:
    selecting, from said gateway address pool, a candidate outside-realm gateway address for combination with said multiplexing information,
    determining whether the combination of the selected candidate outside-realm gateway address and said multiplexing information is already being utilized for another connection;
    repeating, if the combination of the selected candidate outside-realm gateway address and said multiplexing information is already being utilized for another connection, the selecting step until a unique combination is found that is not already being utilized for another connection,
  wherein the unique combination of outside-realm gateway address and said multiplexing information defines an outside-realm gateway state representation that has no counterpart in a predetermined set of existing gateway connection states, and said determining step is based on a comparison in relation to said predetermined set of existing gateway connection states,
  wherein said multiplexing information, for an inside-realm initiated connection, includes at least one of outside node address information and outside node port information, said outside-realm gateway state representation is an at least partially complete gateway state representation, and said predetermined set of gateway connection states includes the existing gateway connection states in said gateway; and
  iii) thereafter, initiating establishment of said requested connection based on the unique combination of outside-realm gateway address and said multiplexing information.

2. The method according to claim 1, further comprising the step of maintaining a separate list representation of said predetermined set of existing gateway connection states, and wherein said outside-realm gateway state representation is selected based on comparison with corresponding information of said gateway connection states represented in said list representation.

3. The method according to claim 1, wherein said selecting step also includes selecting associated gateway port information for combination with said multiplexing information, said outside-realm representation is a complete outside-realm representation, and said step of initiating establishment of said connection comprises the step of requesting that said gateway creates a gateway connection state based on said complete outside-realm representation.

4. The method according to claim 1, wherein said outside-realm representation is a partially complete outside-realm representation, and said step of initiating establishment of said connection comprises the step of requesting that said gateway creates a partially complete gateway connection state based on said partially complete outside-realm representation.

5. A method for supporting establishment of a requested connection between a node of an inside address realm and a node of an outside address realm through an intermediate communication gateway having a gateway address pool comprising a limited number of available outside-realm gateway addresses for enabling outside-realm representation of inside-realm nodes, said method comprising the steps of:
  i) providing multiplexing information including at least one of network address information and port information of at least one of said inside-realm node and said outside-realm node;
  ii) performing, prior to initiating establishment of said requested connection, a network address allocation procedure to determine an outside-realm gateway address based on a unique combination of one of said limited number of outside-realm gateway addresses and said multiplexing information, said network address allocation procedure including the steps of:
    selecting, from said gateway address pool, a candidate outside-realm gateway address for combination with said multiplexing information,
    determining whether the combination of the selected candidate outside-realm gateway address and said multiplexing information is already being utilized for another connection;
    repeating, if the combination of the selected candidate outside-realm gateway address and said multiplexing information is already being utilized for another connection, the selecting step until a unique combination is found that is not already being utilized for another connection,
  wherein the unique combination of outside-realm gateway address and said multiplexing information defines an outside-realm gateway state representation that has no counterpart in a predetermined set of existing gateway connection states, and said determining step is based on a comparison in relation to said predetermined set of existing gateway connection states, wherein said multiplexing information, for an outside-realm initiated connection, includes at least one of outside node address information and inside node port information, said outside-realm gateway state representation is a partially complete gateway state representation and said predetermined set of gateway connection states includes the existing partially complete gateway connection states in said gateway; and iii) thereafter, initiating establishment of said requested connection based on the unique combination of outside-realm gateway address and said multiplexing information.

6. The method according to claim 5, wherein outside-realm gateway addresses of the gateway are traversed until finding an outside-realm gateway address, which in combination with said multiplexing information has no counterpart in any existing partially complete gateway connection state.

7. The method according to claim 5, wherein said step of determining whether the combination of the selected candidate outside-realm gateway address and said multiplexing information is already being utilized for a connection comprises the step of verifying that a pre-allocated outside-realm gateway address in combination with said
multiplexing information has no counterpart in any existing partially complete gateway connection state.

8. The method according to claim 5, wherein said step of initiating establishment of said connection comprises the step of requesting that said gateway establishes a partially complete gateway connection state based on said partially complete outside-realm representation.

9. The method according to claim 8, further comprising the step of transforming, upon receipt of a packet from said outside node to said gateway, said partially complete gateway connection state that has been created in said gateway into a complete gateway connection state based on complementary connection information associated with said packet.

10. The method according to claim 9, wherein said multiplexing information is predetermined outside node address information, and said complementary connection information includes inside node port information and outside node port information.

11. The method according to claim 9, wherein said multiplexing information is predetermined inside node port information, and said complementary connection information includes outside node address information and outside node port information.

12. The method according to claim 5, further comprising the steps of:

selecting, if it is not possible to find a unique combination based on predetermined inside node port information, another gateway port; and selecting an outside-realm gateway address based on said selected gateway port to define a unique, partially complete outside-realm representation of a gateway connection state.

13. The method according to claim 5, wherein said multiplexing information originates from a user-resource identifier query initiated from said outside node.

14. The method according to claim 5, wherein said connection establishment is based on said outside-realm gateway state representation and a corresponding inside-realm gateway state representation.

15. The method according to claim 5, further comprising the steps of:

preparing, at said outside node, a user-resource identifier query that includes an inside node identifier as well as said multiplexing information including at least one of outside node address information and inside node port information;

determining inside-realm network address information based on said inside node identifier included in said identifier query; selecting, based on said multiplexing information included in said identifier query, said outside-realm gateway address to be used in establishing a dynamic gateway connection state for a flow between said outside node and said inside node through said gateway; and establishing said dynamic gateway connection state based on said selected outside-realm gateway address, said multiplexing information included in said identifier query and said inside-realm network address information, thereby enabling an outside-realm initiated connection.

16. The method according to claim 15, wherein said step of establishing said dynamic gateway connection state comprises the steps of:

creating a partially complete gateway connection state based on said selected outside-realm gateway address, said multiplexing information included in said identifier query and said inside-realm network address information; and upon receipt of a packet from said outside node to said gateway, transforming said partially complete gateway state into a complete gateway connection state based on complementary connection information associated with said packet.

17. The method according to claim 16, wherein said multiplexing information included in said identifier query is an outside network address of said outside node, and said complementary connection information for completing the gateway connection state includes a port number of said inside node and a port number of said outside node.

18. The method according to claim 16, wherein said multiplexing information included in said identifier query is an inside node port number, and said complementary connection information for completing the gateway connection state includes an outside network address of said outside node and a port number of said outside node.

19. The method according to claim 15, wherein said step of selecting an outside-realm gateway address comprises the step of selecting an outside-realm gateway address, which in combination with said multiplexing information included in said identifier-query defines a partially complete outside-realm gateway state representation that has no counterpart in any existing partially complete gateway connection state.

20. The method according to claim 19, further comprising the step of maintaining a separate list representation of existing partially complete gateway connection states, and wherein said partially complete outside-realm representation is allocated based on comparison with corresponding information of all existing partially complete gateway connection states represented in said list representation.

21. The method according to claim 20, wherein outside-realm gateway addresses associated with said gateway are traversed until finding an outside-realm gateway address, which in combination with said multiplexing information included in said identifier query has no counterpart in any existing partially complete gateway connection state represented in said list representation.

22. The method according to claim 20, wherein said step of determining whether the combination of the selected candidate outside-realm gateway address and said multiplexing information is already being utilized for a connection comprises the step of verifying that a pre-allocated outside-realm gateway address in combination with said multiplexing information included in said identifier query has no counterpart in any existing partially complete gateway connection state represented in said list representation.

23. The method according to claim 15, further comprising the step of notifying said outside node of said selected outside-realm gateway address.

24. The method according to claim 15, wherein said user-resource identifier query is a Domain Name Server (DNS) query.

25. The method according to claim 15, wherein said inside address realm is a private address realm and said outside address realm is a public address realm.

26. A device for supporting establishment of a requested connection between a node of an inside address realm and a node of an outside address realm through an intermediate communication gateway having a gateway address pool comprising a limited number of available outside-realm gateway addresses for enabling outside-realm representation of inside-realm nodes, said device comprising:
  i) means for providing multiplexing information including at least one of network address information and port information of at least one of said inside-realm node and said outside-realm node;
  ii) means for network address allocation to determine an outside-realm gateway address based on a unique combination of one of said limited number of outside-realm gateway addresses and said multiplexing information, said network address allocation means being configured, prior to initiating establishment of said requested connection, for:
    selecting, from said gateway address pool, a candidate outside-realm gateway address for combination with said multiplexing information,
    determining whether the combination of the selected candidate outside-realm gateway address and said multiplexing information is already being utilized for another connection;
    repeating, if the combination of the selected candidate outside-realm gateway address and said multiplexing information is already being utilized for another connection, the selection of outside-realm gateway address until a unique combination is found that is not already being utilized for another connection,
  wherein the unique combination of outside-realm gateway address and said multiplexing information defines an outside-realm gateway state representation that has no counterpart in a predetermined set of existing gateway connection states, and said network address allocation means is configured for determining whether the combination of the selected candidate outside-realm gateway address and said multiplexing information is already being utilized for another connection based on a comparison in relation to said predetermined set of existing gateway connection states,
  wherein said multiplexing information, for an inside-realm initiated connection, includes at least one of outside node address information and outside node port information, said outside-realm gateway state representation is an at least partially complete gateway state representation, and said predetermined set of gateway connection states includes the existing gateway connection states in said gateway; and
  iii) means for initiating establishment of said requested connection based on the unique combination of outside-realm gateway address and said multiplexing information.

27. The device according to claim 26, further comprising means for maintaining a separate list representation of said predetermined set of existing gateway connection states, and wherein said network address allocation means is configured for finding said outside-realm gateway state representation based on comparison with corresponding information of said gateway connection states represented in said list representation.

28. The device according to claim 26, wherein said network address allocation means is configured for selecting also associated gateway port information for combination with said multiplexing information, said outside-realm representation is a complete outside-realm representation, and said means for initiating establishment of said connection comprises means for requesting that said gateway creates a gateway connection state based on said complete outside-realm representation.

29. The device according to claim 26, wherein said outside-realm representation is a partially complete outside-realm representation, and said means for initiating establishment of said connection comprises means for requesting that said gateway creates a partially complete gateway connection state based on said partially complete outside-realm representation.

30. A device for supporting establishment of a requested connection between a node of an inside address realm and a node of an outside address realm through an intermediate communication gateway having a gateway address pool comprising a limited number of available outside-realm gateway addresses for enabling outside-realm representation of inside-realm nodes, said device comprising:
  i) means for providing multiplexing information including at least one of network address information and port information of at least one of said inside-realm node and said outside-realm node;
  ii) means for network address allocation to determine an outside-realm gateway address based on a unique combination of one of said limited number of outside-realm gateway addresses and said multiplexing information, said network address allocation means being configured, prior to initiating establishment of said requested connection, for:
    selecting, from said gateway address pool, a candidate outside-realm gateway address for combination with said multiplexing information,
    determining whether the combination of the selected candidate outside-realm gateway address and said multiplexing information is already being utilized for another connection;
    repeating, if the combination of the selected candidate outside-realm gateway address and said multiplexing information is already being utilized for another connection, the selection of outside-realm gateway address until a unique combination is found that is not already being utilized for another connection,
  wherein the unique combination of outside-realm gateway address and said multiplexing information defines an outside-realm gateway state representation that has no counterpart in a predetermined set of existing gateway connection states, and said network address allocation means is configured for determining whether the combination of the selected candidate outside-realm gateway address and said multiplexing information is already being utilized for another connection based on a comparison in relation to said predetermined set of existing gateway connection states, wherein said multiplexing information, for an outside-realm initiated connection, includes at least one of outside node address information and inside node port information, said outside-realm gateway state representation is a partially complete gateway state representation and said predetermined set of gateway connection states includes the existing partially complete gateway connection states in said gateway; and iii) means for initiating establishment of said requested connection based on the unique combination of outside-realm gateway address and said multiplexing information.

31. The device according to claim 30, wherein said network address allocation means is configured for traversing outside-realm gateway addresses of the gateway until finding an outside-realm gateway address, which in combination with said multiplexing information has no counterpart in any existing partially complete gateway connection state.

32. The device according to claim 30, wherein said means for determining whether the combination of the selected candidate outside-realm gateway address and said multiplexing information is already being utilized for a connection comprises means for verifying that a pre-allocated outside-realm gateway address in combination with said multiplexing information has no counterpart in any existing partially complete gateway connection state.

33. The device according to claim 30, wherein said means for initiating establishment of said connection comprises means for requesting that said gateway establishes a partially complete gateway connection state based on said partially complete outside-realm representation.

34. The device according to claim 33, further comprising means for transforming, upon receipt of a packet from said outside node to said gateway, said partially complete gateway connection state that has been created in said gateway into a complete gateway connection state based on complementary connection information associated with said packet.

35. The device according to claim 34, wherein said multiplexing information is predetermined outside node address information, and said complementary connection information includes inside node port information and outside node port information.

36. The device according to claim 34, wherein said multiplexing information is predetermined inside node port information, and said complementary connection information includes outside node address information and outside node port information.

37. The device according to claim 30, further comprising means for selecting, if it is not possible to find a unique combination based on predetermined inside node port information, another gateway port, and means for selecting an outside-realm gateway address based on said selected gateway port to define a unique, partially complete outside-realm representation of a gateway connection state.

38. The device according to claim 30, wherein said multiplexing information originates from a user-resource identifier query initiated from said outside node.

39. The device according to claim 30, wherein said means for initiating establishment of said connection is configured to operate based on said outside-realm gateway state representation and a corresponding inside-realm gateway state representation.

40. The device according to claim 30, further comprising:
means, responsive to a user-resource identifier query from said outside node, for determining inside-realm network address information based on an inside node identifier included in said identifier query, wherein said identifier query further includes said multiplexing information including at least one of outside node address information and inside node port information;

means for selecting, based on said multiplexing information included in said identifier query, said outside-realm gateway address to be used in establishing a dynamic gateway connection state for a flow between said outside node and said inside node through said gateway; and means for establishing said dynamic gateway connection state based on said selected outside-realm gateway address, said multiplexing information included in said identifier query and said inside-realm network address information, thereby enabling an outside-realm initiated connection.

41. The device according to claim 40, wherein said means for establishing said dynamic gateway connection state comprises:
means for creating a partially complete gateway connection state based on said selected outside-realm gateway address, said multiplexing information included in said identifier query and said inside-realm network address information; and means for transforming, upon receipt of a packet from said outside node to said gateway, said partially complete gateway state into a complete gateway connection state based on complementary connection information associated with said packet.

42. The device according to claim 41, wherein said multiplexing information included in said identifier query is an outside network address of said outside node, and said complementary connection information for completing the gateway connection state includes a port number of said inside node and a port number of said outside node.

43. The device according to claim 41, wherein said multiplexing information included in said identifier query is an inside node port number, and said complementary connection information for completing the gateway connection state includes an outside network address of said outside node and a port number of said outside node.

44. The device according to claim 40, wherein said means for selecting an outside-realm gateway address is operable for selecting an outside-realm gateway address, which in combination with said multiplexing information included in said identifier-query defines a partially complete outside-realm gateway state representation that has no counterpart in any existing partially complete gateway connection state.

45. The device according to claim 44, further comprising means for maintaining a separate list representation of existing partially complete gateway connection states, and wherein said network address allocation means is configured for finding said partially complete outside-realm representation based on comparison with corresponding information of all existing partially complete gateway connection states represented in said list representation.

46. The device according to claim 45, wherein said network address allocation means is configured for traversing outside-realm gateway addresses associated with said gateway until finding an outside-realm gateway address, which in combination with said multiplexing information included in said identifier query has no counterpart in any existing partially complete gateway connection state represented in said list representation.

47. The device according to claim 45, wherein said means for determining whether the combination of the selected candidate outside-realm gateway address and said multiplexing information is already being utilized for a connection comprises means for verifying that a pre-allocated outside-realm gateway address in combination with said multiplexing information included in said identifier query has no counterpart in any existing partially complete gateway connection state represented in said list representation.

48. The device according to claim 40, further comprising means for notifying said outside node of said selected outside-realm gateway address.

49. The device according to claim 40, wherein said user-resource identifier query is a Domain Name Server (DNS) query.

50. The device according to claim 40, wherein said inside address realm is a private address realm and said outside address realm is a public address realm.

51. A gateway resource manager for a communication gateway that has a limited number of available outside-realm gateway addresses for enabling outside-realm representation of inside-realm nodes, said gateway resource manager comprising:
  i) an input configured to receive multiplexing information including at least one of network address information and port information of at least one of said inside-realm node and said outside-realm node;
  ii) network address allocation circuitry configured to determine an outside-realm gateway address based on a unique combination of one of said limited number of outside-realm gateway addresses and said multiplexing information, said network address allocation circuitry being configured to perform the following tasks prior to initiating establishment of a requested connection:
    select, from said outside-realm gateway addresses, a candidate outside-realm gateway address for combination with said multiplexing information;
    determine whether the combination of the selected candidate outside-realm gateway address and said multiplexing information is already being utilized for another connection;
    repeat, if the combination of the selected candidate outside-realm gateway address and said multiplexing information is already being utilized for another connection, the selection of outside-realm gateway address until a unique combination is found that is not already being utilized for another connection,
  wherein the unique combination of outside-realm gateway address and said multiplexing information defines an outside-realm gateway state representation that has no counterpart in a predetermined set of existing gateway connection states, and said network address allocation circuitry is configured for determining whether the combination of the selected candidate outside-realm gateway address and said multiplexing information is already being utilized for another connection based on a comparison in relation to said predetermined set of existing gateway connection states,
  wherein said multiplexing information, for an inside-realm initiated connection, includes at least one of outside node address information and outside node port information, said outside-realm gateway state representation is an at least partially complete gateway state representation, and said predetermined set of gateway connection states includes the existing gateway connection states in said gateway; and
  iii) resource allocation circuitry configured to initiate establishment of said requested connection based on the unique combination of outside-realm gateway address and said multiplexing information.

52. The gateway resource manager according to claim 51, wherein said network address allocation circuitry is configured for finding said outside-realm gateway state representation based on comparison with corresponding information of said gateway connection states represented in a list representation of said predetermined set of existing gateway connection states.

53. A gateway resource manager for a communication gateway that has a limited number of available outside-realm gateway addresses for enabling outside-realm representation of inside-realm nodes, said gateway resource manager comprising:
  i) an input configured to receive multiplexing information including at least one of network address information and port information of at least one of said inside-realm node and said outside-realm node;
  ii) network address allocation circuitry configured to determine an outside-realm gateway address based on a unique combination of one of said limited number of outside-realm gateway addresses and said multiplexing information, said network address allocation circuitry being configured to perform the following tasks prior to initiating establishment of a requested connection:
    select, from said outside-realm gateway addresses, a candidate outside-realm gateway address for combination with said multiplexing information;
  determine whether the combination of the selected candidate outside-realm gateway address and said multiplexing information is already being utilized for another connection;
    repeat, if the combination of the selected candidate outside-realm gateway address and said multiplexing information is already being utilized for another connection, the selection of outside-realm gateway address until a unique combination is found that is not already being utilized for another connection,
  wherein the unique combination of outside-realm gateway address and said multiplexing information defines an outside-realm gateway state representation that has no counterpart in a predetermined set of existing gateway connection states, and said network address allocation circuitry is configured for determining whether the combination of the selected candidate outside-realm gateway address and said multiplexing information is already being utilized for another connection based on a comparison in relation to said predetermined set of existing gateway connection states,
  wherein said multiplexing information, for an outside-realm initiated connection, includes at least one of outside node address information and inside node port information, said outside-realm gateway state representation is a partially complete gateway state representation and said predetermined set of gateway connection states includes the existing partially complete gateway connection states in said gateway; and
  iii) resource allocation circuitry configured to initiate establishment of said requested connection based on the unique combination of outside-realm gateway address and said multiplexing information.

54. The gateway resource manager according to claim 53, wherein said input is configured to receive inside-realm network address information corresponding to an inside node, and multiplexing information including at least one of outside node address information and inside node port information;

said outside-realm gateway address is to be used in establishing a dynamic gateway connection state for a flow between said outside node and said inside node through said gateway;

said resource allocation circuitry is configured to request said gateway to establish said dynamic gateway connection state based on said selected outside-realm gateway address, said multiplexing information and said inside-realm network address information.

55. The gateway resource manager according to claim 54, wherein said multiplexing information is an outside node address, and said input is configured to request allocation of said selected outside-realm gateway address to said inside node for traffic coming from said outside node address.

56. The gateway resource manager according to claim 54, wherein said input is configured to send a request to said gateway for establishment of a partially complete gateway connection state based on said selected outside-realm gateway address, said multiplexing information and said inside-realm network address information.

57. The gateway resource manager according to claim 56, further comprising: means for receiving a reply from said gateway that said partially complete gateway connection state has been created; and means for notifying said outside node of said selected outside-realm gateway address in response to said reply from said gateway.

58. The gateway resource manager according to claim 56, wherein said network address allocation circuitry is configured to select an outside-realm gateway address, which in combination with said multiplexing information, defines a partially complete outside-realm gateway state representation that has no counterpart in any existing partially complete gateway connection state.

59. The gateway resource manager according to claim 58, further comprising means for maintaining a list representation of existing partially complete gateway connection states, and wherein said network address allocation circuitry is configured to find said partially complete outside-realm representation based on comparison with corresponding information of all existing partially complete gateway connection states represented in said list representation.

60. The gateway resource manager according to claim 53, wherein said network address allocation circuitry is configured to determine whether the combination of the selected candidate outside-realm gateway address and said multiplexing information is already being utilized for a connection based on comparison with established connections and/or connections under establishment.

* * * * *